US010305958B2

(12) United States Patent
Cook et al.

(10) Patent No.: US 10,305,958 B2
(45) Date of Patent: May 28, 2019

(54) CHECKPOINTING A SET OF STREAM COMPUTING DATA

(71) Applicant: International Business Machines Corporation, Armonk, NY (US)

(72) Inventors: Alexander Cook, Chaska, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/496,401

(22) Filed: Apr. 25, 2017

(65) Prior Publication Data
US 2018/0309810 A1  Oct. 25, 2018

(51) Int. Cl.
| | | |
|---|---|---|
| *G06F 15/173* | (2006.01) | |
| *H04L 29/06* | (2006.01) | |
| *H04L 29/08* | (2006.01) | |
| *H04L 12/26* | (2006.01) | |
| *H04L 12/721* | (2013.01) | |
| *G06F 9/50* | (2006.01) | |
| *G06F 11/14* | (2006.01) | |

(Continued)

(52) U.S. Cl.
CPC .......... *H04L 65/607* (2013.01); *G06F 9/461* (2013.01); *G06F 9/48* (2013.01); *G06F 9/5066* (2013.01); *G06F 11/1451* (2013.01); *G06F 11/1464* (2013.01); *G06F 17/30516* (2013.01); *H04L 41/0896* (2013.01); *H04L 43/0888* (2013.01); *H04L 43/0894* (2013.01); *H04L 45/12* (2013.01); *H04L 47/125* (2013.01); *H04L 65/4069* (2013.01); *H04L 65/601* (2013.01); *H04L 67/1095* (2013.01); *H04L 67/12* (2013.01); *H04N 21/00* (2013.01)

(58) Field of Classification Search
CPC .. G06F 11/1451; G06F 11/1464; G06F 9/461; G06F 9/5066; G06F 8/51
See application file for complete search history.

(56) References Cited

U.S. PATENT DOCUMENTS 9,471,438 B1 * 10/2016 Jacques Da Silva ....................... G06F 11/1451
9,679,016 B1     6/2017 Kekre et al.
(Continued)

OTHER PUBLICATIONS

Accelerated Examination Support Document, U.S. Appl. No. 15/729,913, signed Sep. 8, 2017, 22 pgs.
(Continued)

*Primary Examiner* — Kyung H Shin
(74) *Attorney, Agent, or Firm* — Jay Wahlquist

(57) ABSTRACT

Disclosed aspects relate to checkpointing a set of stream computing data with respect to a stream computing environment having a set of windowed stream operators including both a first windowed stream operator and a second windowed stream operator. It may be identified that the first windowed stream operator has a first subset of the set of stream computing data. It may be identified that the second windowed stream operator has the first subset of the set of stream computing data. It may be determined to checkpoint the first subset of the set of stream computing data without a redundant checkpoint related to the first and second windowed stream operators. The set of stream computing data may be checkpointed without the redundant checkpoint of the first subset of the set of stream computing data.

20 Claims, 14 Drawing Sheets

(51) Int. Cl.
*G06F 9/46* (2006.01)
*G06F 9/48* (2006.01)
*G06F 17/30* (2006.01)
*H04N 21/00* (2011.01)
*H04L 12/24* (2006.01)
*H04L 12/803* (2013.01)

(56) References Cited

U.S. PATENT DOCUMENTS

| | | | |
|---|---|---|---|
| 2005/0120128 A1 | 6/2005 | Willes | |
| 2008/0270403 A1* | 10/2008 | Bookman | G06F 8/51 |
| 2013/0290969 A1 | 10/2013 | Branson | |
| 2014/0282605 A1* | 9/2014 | Jacobson | G06F 9/461 |
| | | | 718/107 |
| 2016/0248688 A1 | 8/2016 | Barsness | |
| 2016/0269247 A1 | 9/2016 | Chakradhar | |
| 2016/0285711 A1 | 9/2016 | Akidau et al. | |
| 2016/0328464 A1 | 11/2016 | Branson et al. | |
| 2017/0139807 A1 | 5/2017 | Barsness et al. | |

OTHER PUBLICATIONS

Cook et al., "Checkpointing a Set of Stream Computing Data," U.S. Appl. No. 15/729,913, filed Oct. 11, 2017.

List of IBM Patents or Patent Applications Treated as Related, Oct. 10, 2017, 2 pgs.

IBM, "Checkpointing," IBM Knowledge Center, IBM Streams 4.2, https://www.ibm.com/support/knowledgecenter/en/SSCRJU_4.2.0/com.ibm.streams.dev.doc/doc/checkpointing.html, printed Oct. 9, 2017, 3 pgs.

IBM, "Debugging streams processing applications," IBM Knowledge Center, IBM Streams 4.2.1., https://www.ibm.com/support/knowledgecenter/en/SSCRJU_4.2.1/com.ibm.streams.dev.doc/doc/spldebugger-container.html, printed Oct. 9, 2017, 3 pgs.

Accelerated Examination Support Document, U.S. Appl. No. 15/995,334, Signed May 16, 2018, 23 pages.

Accelerated Examination Support Document, U.S. Appl. No. 15/995,374, Signed May 16, 2018, 25 pages.

Cook et al., "Checkpointing a Set of Stream Computing Data," U.S. Appl. No. 15/995,334, filed Jun. 1, 2018.

Cook et al., "Checkpointing a Set of Stream Computing Data," U.S. Appl. No. 15/995,374, filed Jun. 1, 2018.

List of IBM Patents or Patent Applications Treated as Related. filed Jun. 5, 2018. 2 pgs.

Unknown, "Flink Streaming-Tumbling and Sliding Windows", http://vishnuviswanath.com/flink_streaming.html Mar. 12, 2016. 6 pages. Last accessed Apr. 10, 2017.

* cited by examiner

CHECKPOINTING A SET OF STREAM COMPUTING DATA

BACKGROUND

This disclosure relates generally to computer systems and, more particularly, relates to checkpointing a set of stream computing data with respect to a stream computing environment having a set of windowed stream operators including both a first windowed stream operator and a second windowed stream operator. The amount of data that needs to be managed is increasing. As data needing to be managed increases, the need for checkpointing a set of stream computing data with respect to a stream computing environment having a set of windowed stream operators including both a first windowed stream operator and a second windowed stream operator may also increase.

SUMMARY

Aspects of the disclosure relate to checkpointing a set of stream computing data with respect to a stream computing environment having a set of windowed stream operators. A set of stream computing data that is shared between multiple stream operators may be checkpointed to facilitate non-redundant data storage. A set of windowed operators of a stream computing environment that share a set of stream computing data may be detected. The shared set of stream computing data may be checkpointed for the set of windowed operators in a non-redundant fashion. Checkpointing operations may be divided between multiple operators of the set of windowed operators to balance the bandwidth and checkpointing workload of the set of windowed operators. Stream computing applications may be compiled to use a shared memory with respect to the set of windowed operators to facilitate data checkpointing. Checkpointing operations may be performed based on the throughput characteristics, resource availability, congestion, performance, and other factors related to the set of windowed stream operators. Checkpointed data may be retrieved to rebuild the state of the window for one or more operators of the set of windowed operators.

Disclosed aspects relate to checkpointing a set of stream computing data with respect to a stream computing environment having a set of windowed stream operators including both a first windowed stream operator and a second windowed stream operator. It may be identified that the first windowed stream operator has a first subset of the set of stream computing data. It may be identified that the second windowed stream operator has the first subset of the set of stream computing data. It may be determined to checkpoint the first subset of the set of stream computing data without a redundant checkpoint related to the first and second windowed stream operators. The set of stream computing data may be checkpointed without the redundant checkpoint of the first subset of the set of stream computing data.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
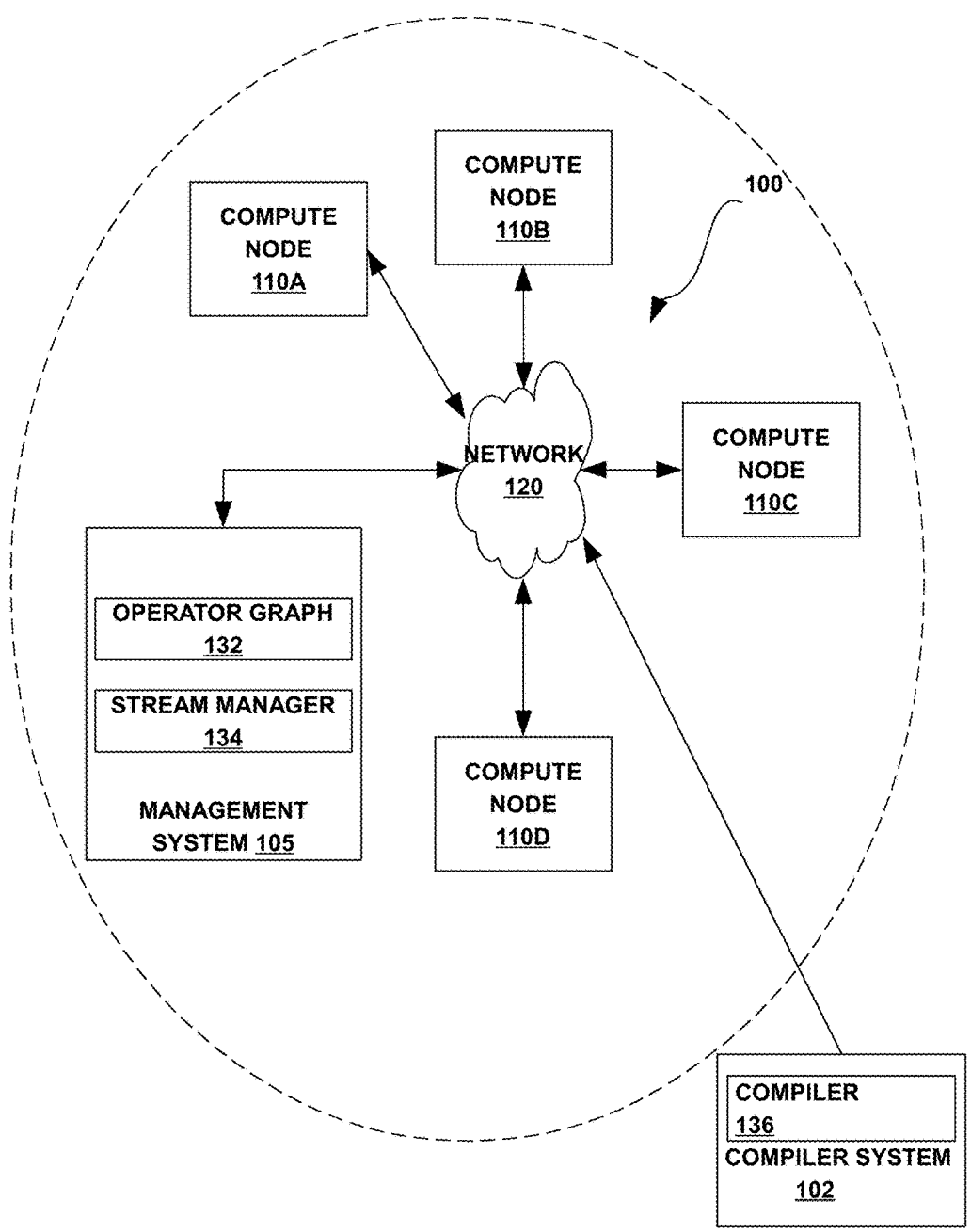
FIG. 1 illustrates an exemplary computing infrastructure to execute a stream computing application according to embodiments.

Aspects of the disclosure relate to checkpointing a set of stream computing data with respect to a stream computing environment having a set of windowed stream operators. A set of stream computing data that is shared between multiple stream operators (e.g., stored on separate hosts) may be checkpointed to facilitate non-redundant data storage. A set of windowed operators of a stream computing environment that share a set of stream computing data may be detected. The shared set of stream computing data may be checkpointed for the set of windowed operators in a non-redundant fashion (e.g., such that overlapping data is not checkpointed multiple times). Checkpointing operations may be divided between multiple operators of the set of windowed operators to balance the bandwidth and checkpointing workload of the set of windowed operators. Stream computing applications may be compiled to use a shared memory with respect to the set of windowed operators to facilitate data checkpointing. Checkpointing operations may be performed based on the throughput characteristics, resource availability, congestion, performance, and other factors related to the set of windowed stream operators. Checkpointed data may be retrieved to rebuild the state of the window for one or more operators of the set of windowed operators. Altogether, leveraging non-redundant checkpointing with respect to shared data of a set of windowed stream operators may be associated with benefits such as data storage efficiency, bandwidth, and stream computing application performance.

In stream computing environments, checkpointing data maintained in stream operator windows is one technique used to facilitate data security and integrity. Aspects of the disclosure relate to the recognition that, in some situations, a plurality of stream operators that share the same set of stream computing data may each perform checkpointing operations, resulting in redundant data storage as the same set of stream computing data is stored in memory multiple times. Accordingly, aspects of the disclosure relate to identifying stream operators that share stream computing data, and checkpointing the stream computing data in a non-redundant fashion (e.g., by designating one or more stream operators to manage checkpointing, dividing checkpoint operations between operators). As such, checkpointing of stream computing data may be performed to promote data storage flexibility, data back-up reliability, and system resource usage efficiency in a stream computing environment.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for checkpointing a set of stream computing data with respect to a stream computing environment having a set of windowed stream operators including both a first windowed stream operator and a second windowed stream operator. It may be identified that the first windowed stream operator has a first subset of the set of stream computing data. It may be identified that the second windowed stream operator has the first subset of the set of stream computing data. It may be determined to checkpoint the first subset of the set of stream computing data without a redundant checkpoint related to the first and second windowed stream operators. The set of stream computing data may be checkpointed without the redundant checkpoint of the first subset of the set of stream computing data.

In embodiments, the first windowed stream operator may be used to checkpoint the first subset of the set of stream computing data and a second windowed stream operator may be prevented from checkpointing the first subset of the set of stream computing data. In embodiments, it may be determined to checkpoint the first subset of the set of stream computing data in response to compiling a stream computing application with respect to the stream computing environment. In embodiments, it may be determined to checkpoint the first subset of the set of stream computing data in advance of compiling a stream computing application with respect to the stream computing environment. In embodiments, a stream computing application may be compiled to use a shared memory for the first subset of the set of stream computing data. In embodiments, it may be detected that the first windowed stream operator is hosted by a first compute node and that the second windowed stream operator is hosted by a second compute node. Altogether, aspects of the disclosure can have performance or efficiency benefits. Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
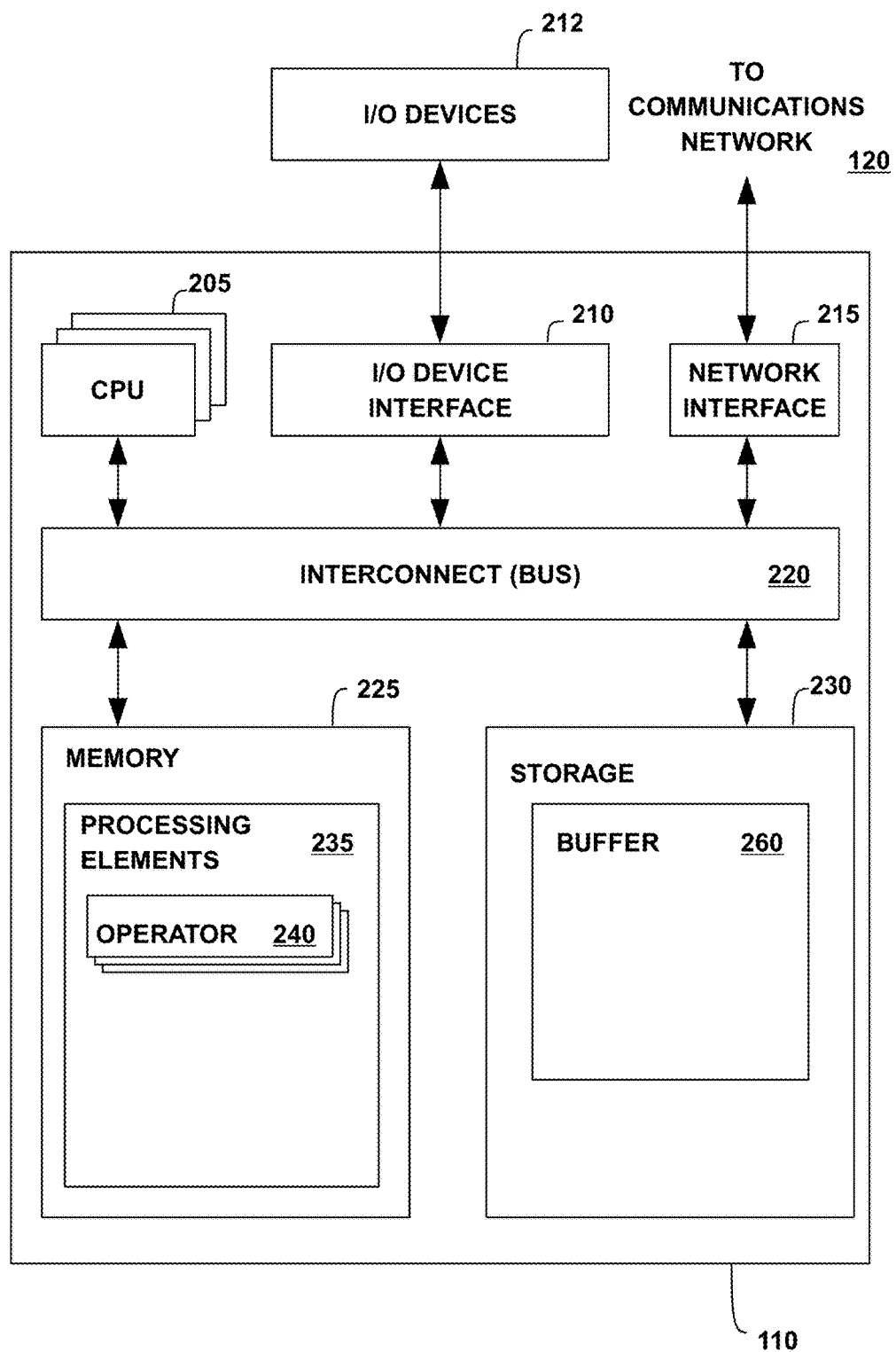
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
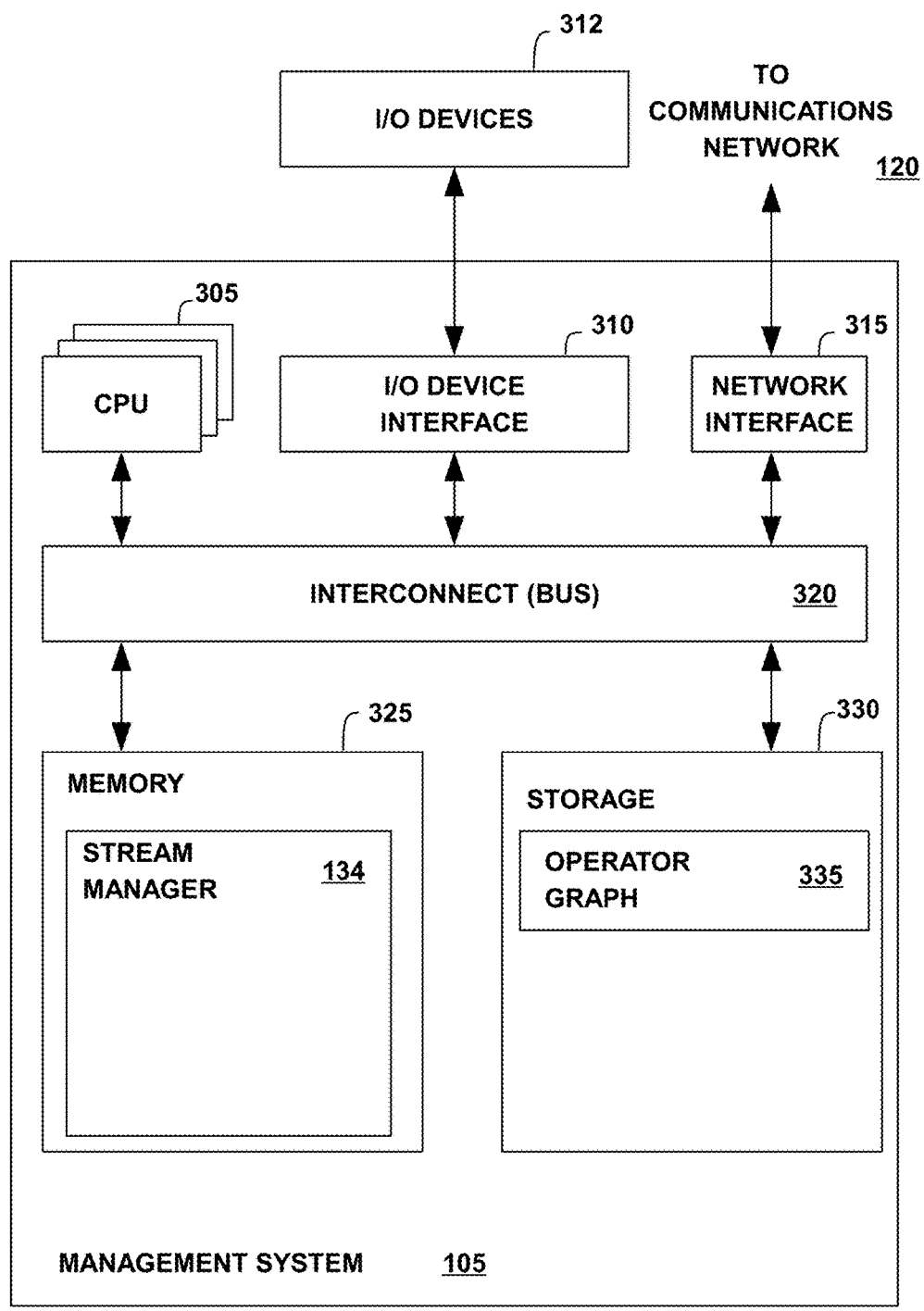
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
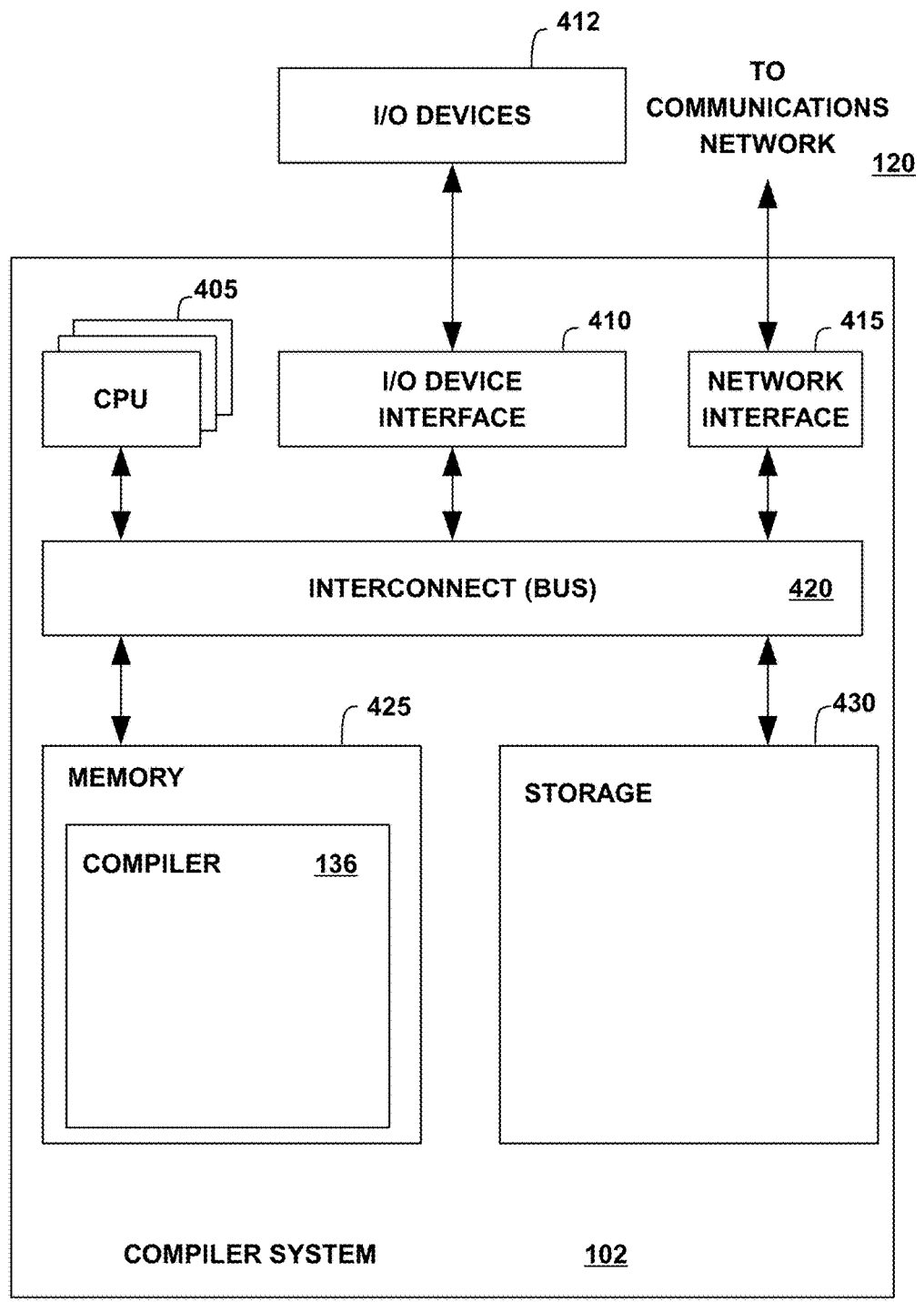
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
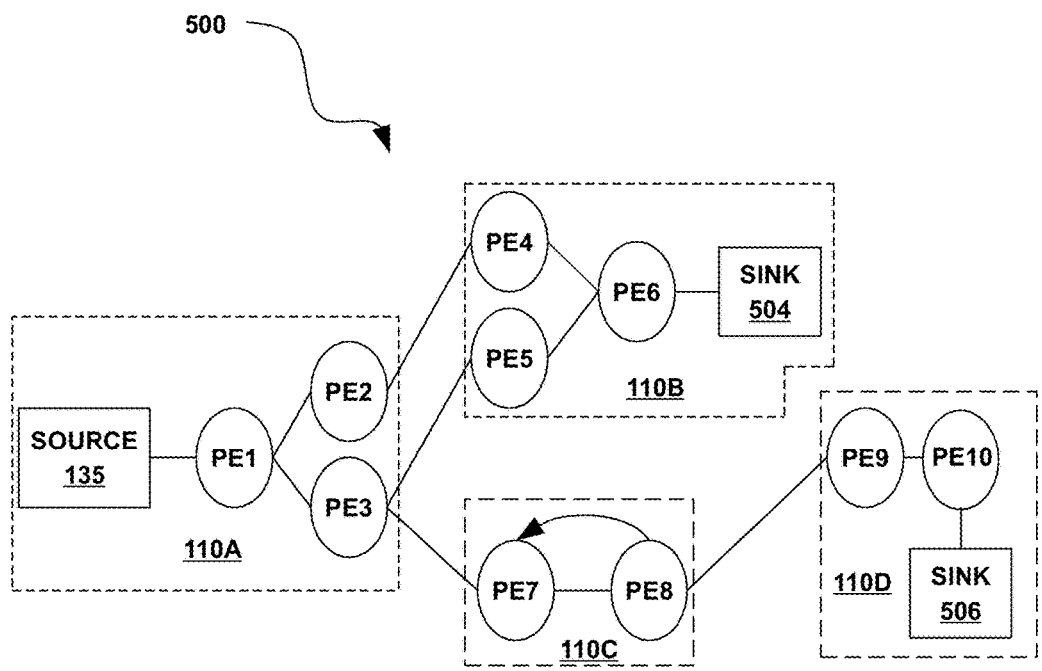
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
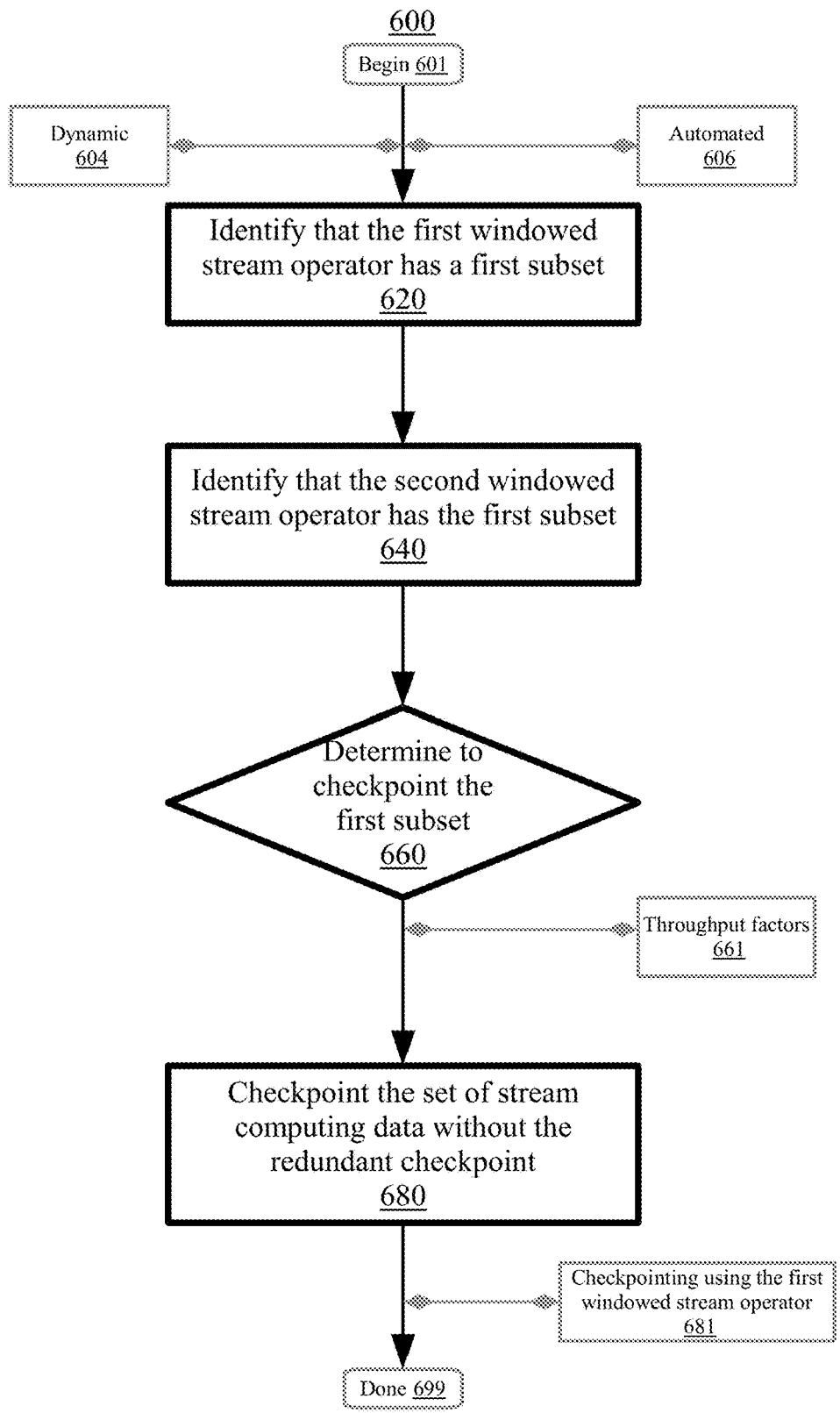
FIG. 6 is a flowchart illustrating a method for checkpointing a set of stream computing data with respect to a stream computing environment having a set of windowed stream operators including both a first windowed stream operator and a second windowed stream operator, according to embodiments.

FIG. 6 is a flowchart illustrating a method 600 for checkpointing a set of stream computing data with respect to a stream computing environment having a set of windowed stream operators including both a first windowed stream operator and a second windowed stream operator, according to embodiments. The stream computing environment may include a platform for dynamically delivering and analyzing data in real-time. The stream computing environment may include an operator graph having a plurality of stream operators (e.g., filter operations, sort operators, join operators) and processing elements configured to perform processing operations on tuples flowing through the operator graph. In embodiments, the stream computing environment may include a set of windowed stream operators. The set of windowed stream operators may include one or more stream operators of the stream computing environment having a window to facilitate data analysis. Generally, the window may include a buffer or queue configured to hold (e.g., maintain) a set of data in order to perform an analysis operation on the set of data. For instance, the window may be configured to hold data (e.g., tuples) over a particular time period (e.g., tuples from the last 1 minute, 10 minutes, 4 hours), a specified number of tuples (e.g., 500 tuples, 1000 tuples), or a designated capacity of data (e.g., 1 gigabyte, 5 gigabytes). Aspects of the disclosure relate to checkpointing a set of stream computing data from one or more windows of the set of windowed stream operators in a non-redundant fashion. The method 600 may begin at block 601.

In embodiments, the identifying, the identifying, the determining, the checkpointing, and the other steps described herein may each be performed in a dynamic fashion at block 604. The steps described herein may be performed in a dynamic fashion to streamline checkpointing of the set of stream computing data. For instance, the identifying, the identifying, the determining, the checkpointing, and the other steps described herein may occur in real-time, ongoing, or on-the-fly. As an example, one or more steps described herein may be performed in real-time (e.g., sets of stream computing data may be dynamically checkpointed in response to identifying that multiple windowed stream operators share the same subset of stream computing data) in order to streamline (e.g., facilitate, promote, enhance) checkpointing of the set of stream computing data. Other methods of performing the steps described herein are also possible.

In embodiments, the identifying, the identifying, the determining, the checkpointing, and the other steps described herein may each be performed in an automated fashion at block 606. The steps described herein may be performed in an automated fashion without user intervention. In embodiments, the identifying, the identifying, the determining, the checkpointing, and the other steps described herein may be carried-out by an internal checkpointing management module maintained in a persistent storage device of a local computing device (e.g., network node). In embodiments, the identifying, the identifying, the determining, the checkpointing, and the other steps described herein may be carried-out by an external configuration management module hosted by a remote computing device or server (e.g., server accessible via a subscription, usage-based, or other service model). In this way, aspects of checkpointing the set of stream computing data may be performed using automated computing machinery without manual action. Other methods of performing the steps described herein are also possible.

At block 620, it may be identified that the first windowed stream operator has a first subset of the set of stream computing data. The identifying may be performed with respect to the stream computing environment. Generally, identifying can include detecting, collecting, sensing, discovering, recognizing, distinguishing, or otherwise ascertaining that the first windowed stream operator has the first subset of the set of stream computing data. The first windowed stream operator may include a stream operator associated with a window of the stream computing environment. For instance, the first windowed stream operator may include a filter operator associated with a window that stores incoming tuples prior to filtering. In embodiments, the first windowed stream operator may be associated with a dedicated window (e.g., window that stores data for exclusive use by the first windowed stream operator). In embodiments, the first windowed stream operator may be associated with a shared window that maintains data for use by multiple stream operators of the set of windows stream operators. The set of stream computing data may include a collection of tuples configured to undergo processing operations by one or more stream operators of the operator graph. As described herein, the first windowed operator may have a first subset of the set of stream computing data. The first subset of the set of stream computing data may include a portion, part, segment, or section of the set of stream computing data that is associated with at least the first windowed stream operator. For instance, the first subset of the set of stream computing data may include tuples that are marked for processing by the first windowed stream operator, have been processed by the first windowed stream operator, are stored in a window communicatively connected to the first windowed stream operator, or the like. In embodiments, identifying that the first windowed stream operator has the first subset of the set of stream computing data may include using a streams management engine to analyze the set of windowed stream operators and determine that one or more windowed stream operators are associated with the first subset of the set of stream computing data (e.g., similar data, overlapping data, identical data). For instance, the streams management engine may identify that a first subset of stream computing data including a set of tuples relating to temperature measurements are stored in a shared window and marked for processing by the first windowed stream operator. Other methods of identifying that the first windowed stream operator has the first subset of the set of stream computing data are also possible.

At block 640, it may be identified that the second windowed stream operator has the first subset of the set of stream computing data. The identifying may be performed with respect to the stream computing environment. Generally, identifying can include detecting, collecting, sensing, discovering, recognizing, distinguishing, or otherwise ascertaining that the second windowed stream operator has the first subset of the set of stream computing data. The second windowed stream operator may include a stream operator associated with a window of the stream computing environment. For instance, the second windowed stream operator may include a sort operator associated with a window that stores incoming tuples prior to sorting. In embodiments, the second windowed stream operator may be associated with a dedicated window (e.g., window that stores data for exclusive use by the second windowed stream operator). In embodiments, the second windowed stream operator may be associated with a shared window that maintains data for use by multiple stream operators of the set of windows stream operators. As described herein, the second windowed operator may have the first subset of the set of stream computing data. In embodiments, the first subset of the set of stream computing data may be substantially similar (e.g., the same, identical, achieve a similarity threshold with respect to, overlap with) between the first and second windowed stream operators (e.g., multiple windowed stream operators have the same set of data). For instance, the first subset of the set of stream computing data may include tuples that are maintained in a common window (e.g., queue) shared by both the first and second windowed stream operators. In embodiments, identifying that the second windowed stream operator has the first subset of the set of stream computing data may include using a streams management engine to analyze the set of windowed stream operators and determine that one or more windowed stream operators are associated with the first subset of the set of stream computing data (e.g., similar data, overlapping data, identical data). For instance, with reference to the previous example, the streams management engine may identify that the first subset of stream computing data including the set of tuples relating to temperature measurements are stored in a shared window and marked for processing by the second windowed stream operator (e.g., as well as the first windowed stream operator). Other methods of identifying that the second windowed stream operator has the first subset of the set of stream computing data are also possible.

At block 660, it may be determined to checkpoint the first subset of the set of stream computing data without a redundant checkpoint related to the first and second windowed stream operators. The determining may be performed based on both the first and second windowed stream operators having the first subset of the set of stream computing data. Generally, determining can include computing, formulating, generating, calculating, selecting, identifying, or otherwise ascertaining to checkpoint the first subset of the set of stream computing data without a redundant checkpoint related to the first and second windowed stream operators. The redundant checkpoint may include an operation to save, store, or retain stream computing data that has already been/will be/is currently in the process of being checkpointed (e.g., such that the same subset of the set of stream computing data is saved multiple times, resulting in excess resource usage in terms of memory, bandwidth, and the like). In embodiments, determining may include ascertaining that the first subset of the set of stream computing data is substantially similar between the first and second windowed stream operators, and subsequently resolving to checkpoint the first subset of the set of stream computing data in a non-redundant fashion. In embodiments, determining may include formulating a checkpoint procedure that designates when and how the first subset of the set of stream computing data will be checkpointed (e.g., to prevent the first subset from being checkpointed multiple times). As an example, determining may include designating a particular windowed stream operator to perform the checkpoint operation (e.g., the first windowed stream operator) and scheduling a specific time period (e.g., 2:57 PM) for the first subset of the set of stream computing data to be checkpointed (e.g., such that the second windowed stream operator does not initiate a redundant checkpoint). Other methods of determining to checkpoint the first subset of the set of stream computing data without a redundant checkpoint related to the first and second windowed stream operators are also possible.

In embodiments, throughput factors may be detected at block 661. A first throughput factor for the first windowed stream operator may be detected. Generally, detecting can include sensing, discovering, collecting, recognizing, distinguishing, generating, obtaining, ascertaining, or otherwise determining the first throughput factor for the first windowed stream operator. The first throughput factor may include a quantitative or qualitative indication of the rate at which data is processed by/flows through the first windowed stream operator. In embodiments, detecting may include using a throughput diagnostic to measure the number of tuples processed by the first windowed stream operator per unit time. As an example, a first throughput factor of "900 tuples per second" may be determined for the first windowed stream operator. In embodiments, a second throughput factor for the second windowed stream operator may be detected. The second throughput factor may include a quantitative or qualitative indication of the rate at which data is processed by/flows through the second windowed stream operator. As an example, a second throughput factor of "700 tuples per second" may be determined for the second windowed stream operator. The first and second throughput factors for the first and second windowed stream operators may be compared. Generally, comparing can include contrasting, analyzing, juxtaposing, correlating, or evaluating the first throughput factor with respect to the second throughput factor. In embodiments, comparing can include examining the magnitude of the first throughput factor with respect to the magnitude of the second throughput factor. As an example, the first throughput factor of "900 tuples per second" may be compared with the second throughput factor of "700 tuples per second." It may be computed that the first throughput factor exceeds the second throughput factor. Generally, computing can include formulating, detecting, calculating, identifying, or otherwise resolving that the first throughput factor exceeds the second throughput factor. In embodiments, computing may include resolving that the magnitude of the first throughput factor is greater than the magnitude of the first throughput factor. With reference to the previous example, computing may include determining that the first throughput factor of "900 tuples per second" exceeds the first throughput factor of "700 tuples per second." In embodiments, it may be determined to use the first windowed stream operator to checkpoint the first subset of the set of stream computing data. Generally, determining can include computing, formulating, generating, calculating, selecting, identifying, or otherwise ascertaining to use the first windowed stream operator to checkpoint the first subset of the set of stream computing data. The determining may be performed based on the first throughput factor exceeding the second throughput factor. In embodiments, determining may include designating the first windowed stream operator to perform the checkpointing operation with respect to the first subset of the set of stream computing data (e.g., as using stream operators with greater throughput factors for checkpointing may be associated with operational efficiency). Other methods of managing checkpoint based on throughput factors for the set of windowed stream operators are also possible.

At block 680, the set of stream computing data may be checkpointed. The checkpointing may be performed without the redundant checkpoint of the first subset of the set of stream computing data related to the first and second windowed stream operators. The checkpointing may be performed with respect to the stream computing environment. Generally, checkpointing can include recording, saving, logging, preserving, storing, maintaining, or otherwise retaining the set of stream computing data. Checkpointing may include capturing a copy (e.g., snapshot) of the set of stream computing data on a separate storage device communicatively connected to the stream computing environment. For instance, checkpointing may include storing the set of stream computing data in a cache, main system memory, hard disk drive, solid state drive, network attached storage (NAS) device, Redis server, or other storage device. As described herein, checkpointing may be performed without a redundant checkpoint of the first subset of the set of stream data. In embodiments, checkpointing may include designating (e.g., selecting, nominating) one or more stream operators to store the set of stream computing data to a storage device (e.g., to prevent multiple stream operators from storing the same data). As an example, consider a set of stream computing data shared between three windowed operators A, B, and C. In certain embodiments, operator B may be designated to perform the checkpointing operation to store the set of stream computing data (e.g., such that A and C need not perform the checkpointing operation). In embodiments, checkpointing may include dividing the checkpointing operation among a plurality of stream operators, and instructing each stream operator to checkpoint a non-overlapping portion of the set of stream computing data (e.g., to facilitate bandwidth and workload balancing with respect to the set of windowed stream operators). For instance, with reference to the previous example, each of the windowed operators A, B, and C may be configured to perform separate checkpoint operations to capture and store different portions of the set of stream computing data. Other methods of checkpointing the set of stream computing data without the redundant checkpoint are also possible.

In embodiments, the set of stream computing data may be checkpointed at block 681. As described herein, in certain embodiments, aspects of the disclosure relate to carrying-out checkpoint operations with respect to the set of stream computing data using one or more designated stream operators (e.g., to prevent redundant checkpointing operations). In embodiments, the checkpointing may be performed using the first windowed stream operator to checkpoint the first subset of the set of stream computing data. The checkpointing may be performed with respect to the stream computing environment. Generally, checkpointing can include recording, saving, logging, preserving, storing, maintaining, or otherwise retaining the first subset of the set of stream computing data using the first windowed stream operator. In embodiments, checkpointing the first subset of the set of stream computing data may include modifying a set of checkpoint access permissions to authorize the first windowed stream operator to perform the checkpointing operation with respect to the first subset of the set of stream computing data. Accordingly, the first windowed stream operator may be configured to perform the checkpointing operation by capturing a copy of the first subset of the set of stream computing data (e.g., from an associated stream operator window), and writing the copy of the first subset of the set of stream computing data to a designated storage device. In embodiments, the second windowed stream operator may be prevented from checkpointing the first subset of the set of stream computing data. The preventing may be performed with respect to the stream computing environment. Generally, preventing can include limiting, blocking, restricting, forbidding, controlling, or otherwise regulating checkpointing of the first subset of the set of stream computing data by the second windowed stream operator. In embodiments, preventing may include modifying a set of checkpoint access permissions to de-authorize the second windowed stream operator from performing the checkpointing operation with respect to the first subset of the set of stream computing data. In certain embodiments, preventing may include using a streams management engine to monitor a task manager for the stream computing environment, and canceling (e.g., blocking) any checkpoint operations initiated by the second windowed stream operator with respect to the first subset of the set of stream computing data. In this way, checkpointing may be performed with respect to the set of stream computing data without a redundant checkpoint. Other methods of checkpointing using the first windowed stream operator and preventing checkpointing using the second windowed stream operator are also possible.

Consider the following example. A stream computing environment may be analyzed using a streams management engine, and it may be identified that four windowed stream operators A, B, C and D all share a first subset of stream computing data related to measured fuel economy values for a vehicle. Based on all four windowed stream operators having the same first subset of stream computing data, it may be determined to checkpoint the first subset of the set of stream computing data. In embodiments, throughput factors for each of the four windowed stream operators may be examined, and it may be ascertained that stream operator A has a throughput factor of 450 tuples per second, stream operator B has a throughput factor of 790 tuples per second, throughput factor C has a throughput factor of 210 tuples per second, and stream operator D has a throughput factor of 1100 tuples per second. As described herein, in certain embodiments, a checkpointing procedure may be determined for the first subset of stream computing data based on the throughput factors for each stream operator. As an example, a checkpointing procedure may be determined that designates stream operator D for performance of the checkpointing operation, as stream operator D has the highest individual throughput factor of the four stream operators. In certain embodiments, a checkpointing procedure may be determined that assigns each stream operator a separate, non-overlapping portion of the stream computing data to checkpoint that is proportional to the throughput rate of that stream operator relative to the other windowed stream operators. For instance, stream operator D may be assigned a 43.1% portion of the first subset, stream operator B may be assigned a 31% portion of the first subset, stream operator A may be assigned a 17.7% portion of the first subset, and stream operator C may be assigned a 8.2% portion of the first subset of the set of stream computing data for individual checkpointing (e.g., such that the entire first subset of the set of stream computing data is checkpointed without redundancy). Other methods of checkpointing a set of stream computing data are also possible.

Method 600 concludes at block 699. Aspects of method 600 may provide performance or efficiency benefits related to checkpointing a set of stream computing data. As an example, checkpointing a set of stream computing data without a redundant checkpoint may save memory space and bandwidth, streamlining data security and integrity with respect to the stream computing environment. Altogether, leveraging non-redundant checkpointing with respect to shared data of a set of windowed stream operators may be associated with benefits such as data storage efficiency, bandwidth, and stream computing application performance. Aspects may save resources such as bandwidth, disk, processing, or memory.

Figure 7:
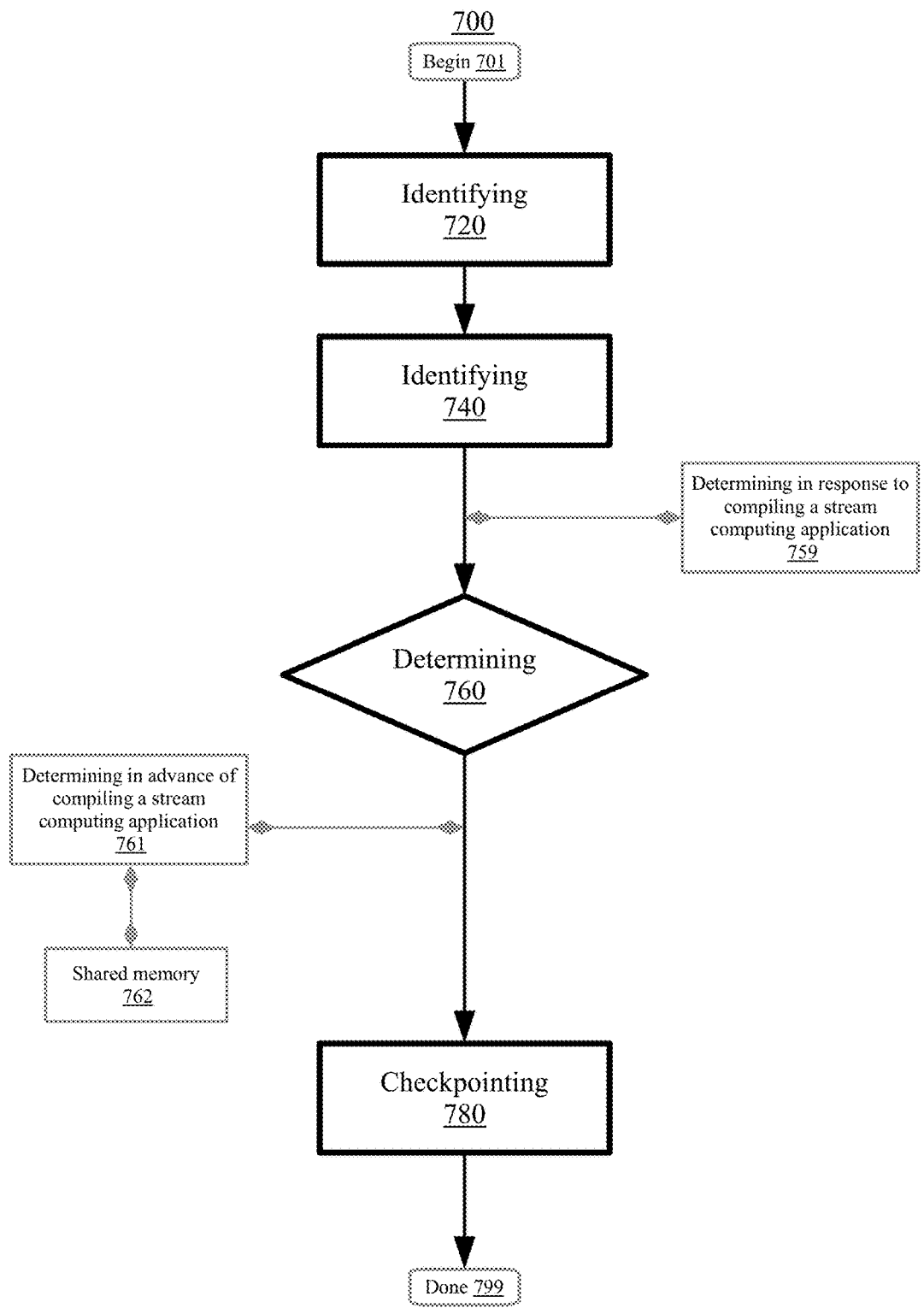
FIG. 7 is a flowchart illustrating a method for checkpointing a set of stream computing data with respect to a stream computing environment having a set of windowed stream operators including both a first windowed stream operator and a second windowed stream operator, according to embodiments.

FIG. 7 is a flowchart illustrating a method 700 for checkpointing a set of stream computing data with respect to a stream computing environment having a set of windowed stream operators including both a first windowed stream operator and a second windowed stream operator, according to embodiments. Aspects of the method 700 relate to managing checkpointing of a set of stream computing data with respect to runtime or compile-time of a stream computing application. Aspects of method 700 may be similar or the same as method 600, and aspects may be utilized interchangeably. The method 700 may begin at block 701. At block 720, it may be identified that the first windowed stream operator has a first subset of the set of stream computing data. The identifying may be performed with respect to the stream computing environment. At block 740, it may be identified that the second windowed stream operator has the first subset of the set of stream computing data. The identifying may be performed with respect to the stream computing environment.

In embodiments, it may be determined to checkpoint the first subset of the set of stream computing data at block 759. The determining may be performed without the redundant checkpoint related to the first and second windowed stream operators. The determining may be performed in response to compiling a stream computing application with respect to the stream computing environment. Aspects of the disclosure relate to the recognition that, in some situations, it may be desirable to dynamically checkpoint stream computing data based on the real-time activity and performance of a stream computing application. Accordingly, aspects of the disclosure relate to checkpointing the first subset of the set of stream computing data in response to compilation of the stream computing application. Generally, determining can include computing, formulating, generating, calculating, selecting, identifying, or otherwise ascertaining to checkpoint the first subset of the set of stream computing data in response to compiling the stream computing application. In embodiments, determining to checkpoint the first subset of the set of stream computing data may include resolving to checkpoint the first subset of the set of stream computing data based on run-time performance characteristics of the stream computing application. For instance, in certain embodiments, the streams management engine may be configured to run a series of performance diagnostics on the stream computing application to identify the throughput factors, window sizes, tuple flow rates, congestion levels, and other characteristics of the set of windowed stream operators, and subsequently ascertain one or more windowed stream operators of the set of windowed stream operators to perform checkpointing based on the measured performance characteristics. For instance, windowed stream operators associated with greater tuple throughput factors, larger window sizes, or lower congestion levels may be prioritized for checkpointing operations (e.g., to facilitate efficient stream operating performance). Other methods of determining to checkpoint the first subset of the set of stream computing data in response to compiling the stream computing application are also possible.

At block 760, it may be determined to checkpoint the first subset of the set of stream computing data without a redundant checkpoint related to the first and second windowed stream operators. The determining may be performed based on both the first and second windowed stream operators having the first subset of the set of stream computing data.

In embodiments, it may be determined to checkpoint the first subset of the set of stream computing data at block 761. The determining may be performed without the redundant checkpoint related to the first and second windowed stream operators. The determining may be performed in advance of compiling a stream computing application with respect to the stream computing environment. Aspects of the disclosure relate to the recognition that, in some situations, un-compiled source code for a stream computing application may be used to ascertain information regarding the performance characteristics of windowed stream operators. Accordingly, aspects of the disclosure relate to determining which stream operators may be used to perform checkpoint operations prior to compiling the stream computing application. Generally, determining can include computing, formulating, generating, calculating, selecting, identifying, or otherwise ascertaining to checkpoint the first subset of the set of stream computing data in advance of compiling a stream computing application. In embodiments, determining may include examining a set of source code for the stream computing application, and identifying a set of code components that correspond to windowed stream operators (e.g., code that will implement operator functionality in the stream computing application after compilation). The set of code components may be examined with respect to a set of projected performance criteria to detect a subset of the set of code components that may be used for checkpointing operations in the stream computing application. As an example, in response to examining the set of source code and identifying the set of code components, the set of code components may be compared with a set of projected performance criteria that define a threshold window size of "2000 tuples." Accordingly, one or more code components that achieve the threshold window size may be marked or tagged for use to checkpoint the first subset of the set of stream computing data. Other methods of determining to checkpoint the first subset of the set of stream computing data in advance of compiling the stream computing application are also possible.

In embodiments, the stream computing application may be compiled at block 762. The stream computing application may be compiled to use a shared memory. The compiling may be performed for the first subset of the set of stream computing data. The compiling may relate to the first and second windowed stream operators. Generally, compiling can include assembling, building, translating, aggregating, constructing, converting, or otherwise structuring the stream computing application to use the shared memory. The shared memory may include a memory resource that is configured for mutual access by the first and second windowed stream operators. For instance, the shared memory may include a set of memory addresses of a main system memory, a shared cache unit, a database, non-volatile memory unit (e.g., hard-drive, solid-state drive), Redis server, or other type of memory resource configured for use by at least the first and second windowed stream operators. In embodiments, compiling the stream computing application to use the shared memory may include examining the source code of the stream computing application to identify a set of stream operator windows that are projected to maintain an identical set of stream computing data, and subsequently defining a shared memory space for use by the windowed stream operators corresponding to the identified windows. Consider the following example. In response to examining the source code of an un-compiled stream computing application, it may be ascertained that a first window corresponding to a first windowed stream operator and a second window corresponding to a second windowed stream operator are configured to receive data from the same output (e.g., such that both will have identical sets of stream computing data). Accordingly, in embodiments, compiling may include modifying the set of source code to designate a set of shared memory addresses for use by both the first and second windowed stream operators and subsequently converting the set of source code into a machine-executable application. In this way, the set of stream computing data may be saved (e.g., checkpointed) in the shared memory where it may be accessible by both the first and second windowed stream operators to facilitate data storage efficiency (e.g., only one copy of the data need be saved instead of two, eliminating redundancy). Other methods of compiling the stream computing application to use a shared memory are also possible.

At block 780, the set of stream computing data may be checkpointed. The checkpointing may be performed without the redundant checkpoint of the first subset of the set of stream computing data related to the first and second windowed stream operators. The checkpointing may be performed with respect to the stream computing environment. Method 700 concludes at block 799. Aspects of method 700 may provide performance or efficiency benefits related to checkpointing a set of stream computing data. Aspects may save resources such as bandwidth, disk, processing, or memory.

Figure 8:
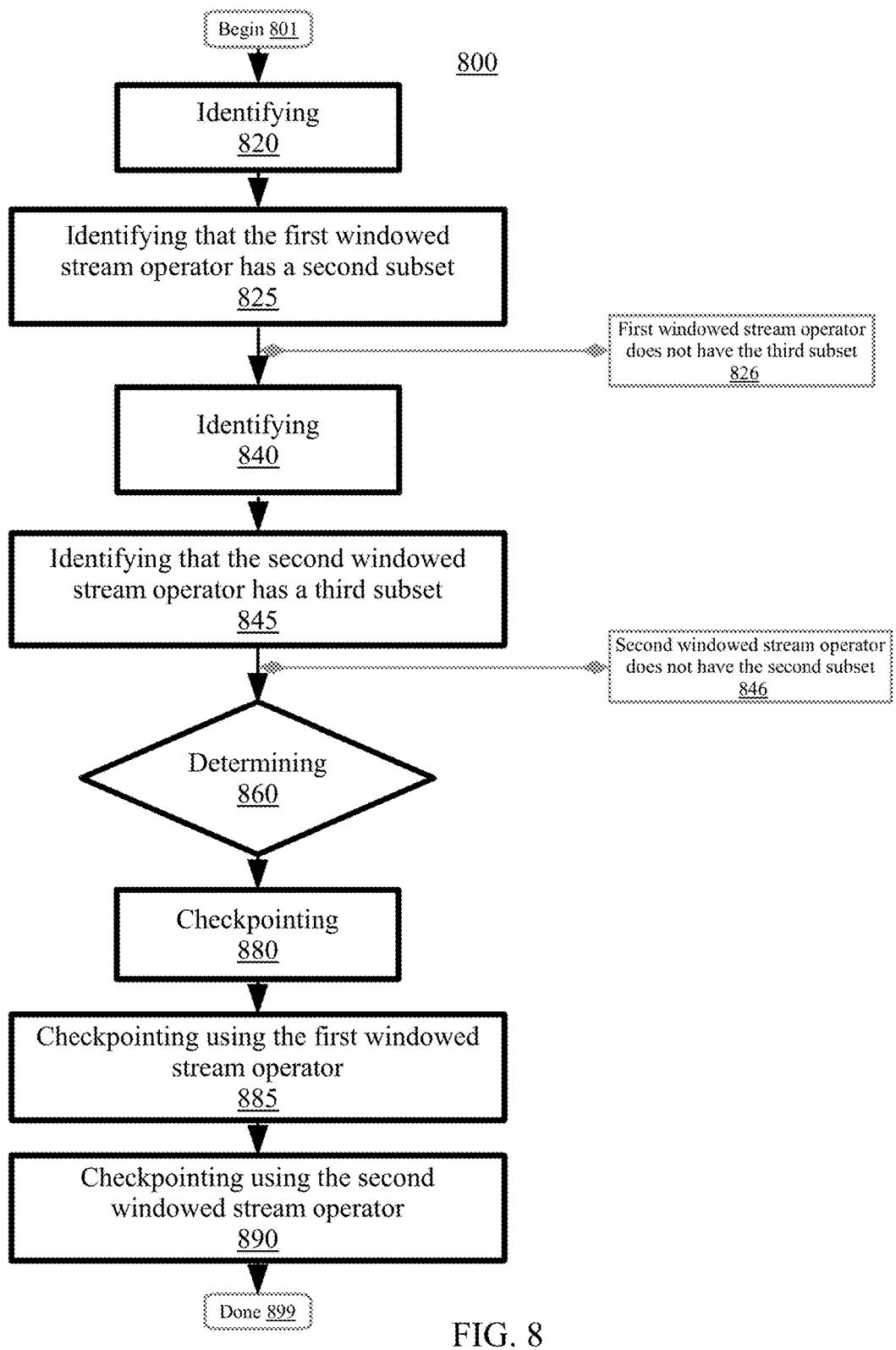
FIG. 8 is a flowchart illustrating a method for checkpointing a set of stream computing data with respect to a stream computing environment having a set of windowed stream operators including both a first windowed stream operator and a second windowed stream operator, according to embodiments.

FIG. 8 is a flowchart illustrating a method 800 for checkpointing a set of stream computing data with respect to a stream computing environment having a set of windowed stream operators including both a first windowed stream operator and a second windowed stream operator, according to embodiments. Aspects of the method 800 relate to using a plurality of different windowed stream operators to checkpoint separate portions of the set of stream computing data. Aspects of method 800 may be similar or the same as method 600/700, and aspects may be utilized interchangeably. The method 800 may begin at block 801. At block 820, it may be identified that the first windowed stream operator has a first subset of the set of stream computing data. The identifying may be performed with respect to the stream computing environment.

At block 825, it may be identified that the first windowed stream operator has a second subset of the set of stream computing data. The identifying may be performed with respect to the stream computing environment. Generally, identifying can include detecting, collecting, sensing, discovering, recognizing, distinguishing, or otherwise ascertaining that the first windowed stream operator has the second subset of the set of stream computing data. As described herein, the first windowed stream operator may include a stream operator associated with a window of the stream computing environment. For instance, the first windowed stream operator may include a functor operator associated with a window that stores incoming tuples prior to processing. In embodiments, the first windowed stream operator may have the second subset of the set of stream computing data. The second subset of the set of stream computing data may include a portion, part, segment, or section of the set of stream computing data that is associated with at least the first windowed stream operator. In embodiments, the second subset of the set of stream computing data may be different from the first subset (e.g., and the third subset) of the set of stream computing data. For instance, the second subset may be mutually exclusive with respect to the first subset (e.g., such that no tuple overlaps between the first and second subsets). In embodiments, it may be identified that the first windowed stream operator does not have a third subset of the set of stream computing data at block 826. The identifying may be performed with respect to the stream computing environment. The third subset of the set of stream computing data may include a portion, part, segment, or section of the set of stream computing data that differs from (e.g., does not overlap with) the first or second subsets of the set of stream computing data. In embodiments, identifying that the first windowed stream operator has the second subset of the set of stream computing data and does not have the third subset may include using the streams management engine to identify one or more windows associated with the first windowed stream operator, and examining the contents of the one or more windows to ascertain that the one or more windows include tuples corresponding to the second subset of the set of stream computing data but not tuples corresponding to the third subset of the set of stream computing data. Other methods of identifying that the first windowed stream operator has the second subset of the set of stream computing data and does not have the third subset of the set of stream computing data are also possible.

At block 840, it may be identified that the second windowed stream operator has the first subset of the set of stream computing data. The identifying may be performed with respect to the stream computing environment.

At block 845, it may be identified that the second windowed stream operator has a third subset of the set of stream computing data. The identifying may be performed with respect to the stream computing environment. Generally, identifying can include detecting, collecting, sensing, discovering, recognizing, distinguishing, or otherwise ascertaining that the second windowed stream operator has the third subset of the set of stream computing data. As described herein, the second windowed stream operator may include a stream operator associated with a window of the stream computing environment. For instance, the second windowed stream operator may include a barrier operator associated with a window that stores incoming tuples prior to processing. In embodiments, the second windowed stream operator may have the third subset of the set of stream computing data. As described herein, the third subset of the set of stream computing data may include a portion, part, segment, or section of the set of stream computing data that is associated with at least the second windowed stream operator and differs from the first subset and the second subset of the set of stream computing data. For instance, the third subset may be mutually exclusive with respect to the first and second subsets (e.g., such that no tuple overlaps between the first, second and third subsets). In embodiments, it may be identified that the second windowed stream operator does not have the second subset of the set of stream computing data at block 846. The identifying may be performed with respect to the stream computing environment. In embodiments, identifying that the second windowed stream operator has the third subset of the set of stream computing data and does not have the second subset may include using the streams management engine to identify one or more windows associated with the second windowed stream operator, and examining the contents of the one or more windows to ascertain that the one or more windows include tuples corresponding to the third subset of the set of stream computing data but not tuples corresponding to the second subset of the set of stream computing data. Other methods of identifying that the second windowed stream operator has the third subset of the set of stream computing data and does not have the second subset of the set of stream computing data are also possible.

At block 860, it may be determined to checkpoint the first subset of the set of stream computing data without a redundant checkpoint related to the first and second windowed stream operators. The determining may be performed based on both the first and second windowed stream operators having the first subset of the set of stream computing data. At block 880, the set of stream computing data may be checkpointed. The checkpointing may be performed without the redundant checkpoint of the first subset of the set of stream computing data related to the first and second windowed stream operators. The checkpointing may be performed with respect to the stream computing environment.

At block 885, the set of stream computing data may be checkpointed using the first windowed stream operator to checkpoint the second subset of the set of stream computing data. The checkpointing may be performed with respect to the stream computing environment. Generally, checkpointing can include recording, saving, logging, preserving, storing, maintaining, or otherwise retaining the second subset of the set of stream computing data using the first windowed stream operator. As described herein, checkpointing may include capturing a copy (e.g., snapshot) of the second subset of the set of stream computing data on a separate storage device communicatively connected to the stream computing environment. In embodiments, checkpointing may include using the streams management engine to instruct the first windowed stream operator to checkpoint the second subset of the set of stream computing data by writing the second subset of the set of stream computing data to a designated memory location for storage. As an example, the first windowed stream operator may read the second subset from an associated stream computing window, and subsequently write the second subset to a specified set of memory addresses of system memory. Other methods of checkpointing the second subset of the set of stream computing data using the first windowed stream operator are also possible.

At block 890, the set of stream computing data may be checkpointed using the second windowed stream operator to checkpoint the third subset of the set of stream computing data. The checkpointing may be performed with respect to the stream computing environment. Generally, checkpointing can include recording, saving, logging, preserving, storing, maintaining, or otherwise retaining the third subset of the set of stream computing data using the second windowed stream operator. As described herein, checkpointing may include capturing a copy (e.g., snapshot) of the third subset of the set of stream computing data on a separate storage device communicatively connected to the stream computing environment. In embodiments, checkpointing may include using the streams management engine to schedule a checkpoint operation with respect to the second windowed stream operator, such that the second windowed stream operator is configured to transmit the third subset of the set of stream computing data to a specified storage device at a designated time. As an example, the streams management engine may schedule a checkpoint operation for the second windowed stream operator at a designated time of "11:15 AM," such that the second windowed stream operator is configured to transfer the third subset of the set of stream computing data to a communicatively connected network attached storage device at the designated time of "11:15 AM." Other methods of checkpointing the third subset of the set of stream computing data using the third windowed stream operator are also possible.

Method 800 concludes at block 899. Aspects of method 800 may provide performance or efficiency benefits related to checkpointing a set of stream computing data. Altogether, leveraging non-redundant checkpointing with respect to shared data of a set of windowed stream operators may be associated with benefits such as data storage efficiency, bandwidth, and stream computing application performance. Aspects may save resources such as bandwidth, disk, processing, or memory.

Figure 9:
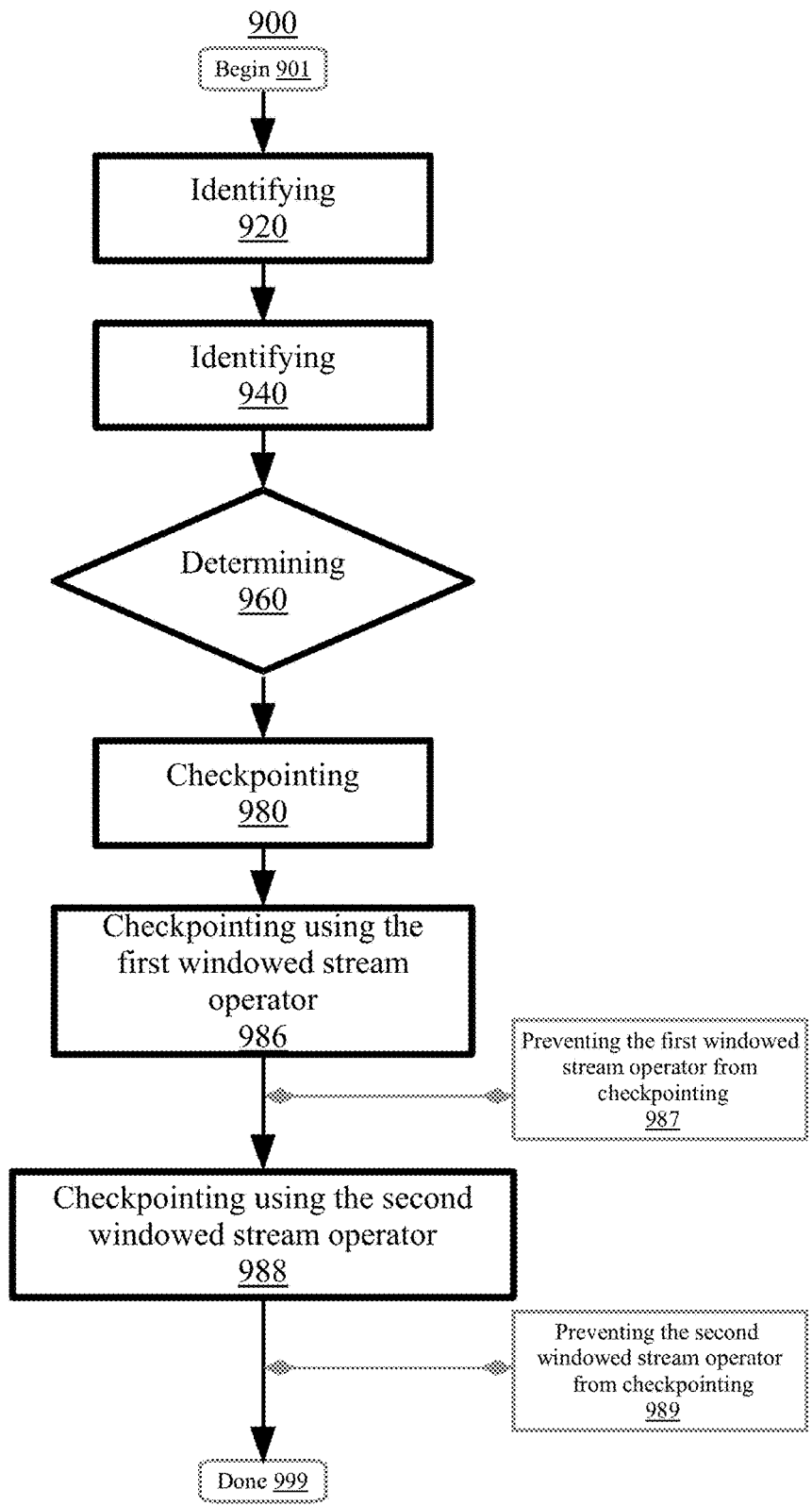
FIG. 9 is a flowchart illustrating a method for checkpointing a set of stream computing data with respect to a stream computing environment having a set of windowed stream operators including both a first windowed stream operator and a second windowed stream operator, according to embodiments.

FIG. 9 is a flowchart illustrating a method 900 for checkpointing a set of stream computing data with respect to a stream computing environment having a set of windowed stream operators including both a first windowed stream operator and a second windowed stream operator, according to embodiments. Aspects of method 900 may be similar or the same as method 600/700/800, and aspects may be utilized interchangeably. The method 900 may begin at block 901. At block 920, it may be identified that the first windowed stream operator has a first subset of the set of stream computing data. The identifying may be performed with respect to the stream computing environment. At block 940, it may be identified that the second windowed stream operator has the first subset of the set of stream computing data. The identifying may be performed with respect to the stream computing environment. At block 960, it may be determined to checkpoint the first subset of the set of stream computing data without a redundant checkpoint related to the first and second windowed stream operators. The determining may be performed based on both the first and second windowed stream operators having the first subset of the set of stream computing data. At block 980, the set of stream computing data may be checkpointed. The checkpointing may be performed without the redundant checkpoint of the first subset of the set of stream computing data related to the first and second windowed stream operators. The checkpointing may be performed with respect to the stream computing environment.

At block 986, the set of stream computing data may be checkpointed using the first windowed stream operator to checkpoint a first portion of the first subset of the set of stream computing data. The checkpointing may be performed with respect to the stream computing environment. Generally, checkpointing can include recording, saving, logging, preserving, storing, maintaining, or otherwise retaining the set of stream computing data using the first windowed stream operator to checkpoint a first portion of the first subset of the set of stream computing data. The first portion may include a part, segment, section, or fraction of the first subset of the set of stream computing data. In embodiments, the first portion may include a segment of the stream computing data that is exclusively used by (e.g., unique to, particular to) the first windowed stream operator (e.g., not shared by other windowed stream operators). In embodiments, the first portion may differ from (e.g., not overlap with, be mutually exclusive with respect to) a second portion of the first subset of the set of stream computing data. As an example, in a situation in which the set of stream computing data relates to an Internet-of-Things environment, the first portion may include a subset of the set of stream computing data that includes temperature measurements that are marked for filtering by a first windowed stream operator of a filter operator. In embodiments, checkpointing the first portion of the set of stream computing data using the first windowed stream operator may include configuring the first windowed stream operator to parse the set of stream computing data to identify the first portion of the first subset of the set of stream computing data (e.g., tuples marked for processing by the first windowed stream operator), and subsequently transmitting the first portion to a designated storage device to be maintained. Other methods of checkpointing the set of stream computing data using the first windowed stream operator to checkpoint a first portion of the first subset of the set of stream computing data are also possible.

In embodiments, the first windowed stream operator may be prevented from checkpointing the second portion of the first subset of the set of stream computing data at block 987. The preventing may be performed with respect to the stream computing environment. Generally, preventing can include limiting, blocking, restricting, forbidding, controlling, or otherwise regulating checkpointing of the first portion of the first subset of the set of stream computing data by the first windowed stream operator. In embodiments, preventing may include modifying a set of checkpoint access permissions to de-authorize the first windowed stream operator from performing the checkpointing operation with respect to a second portion of the first subset of the set of stream computing data. In certain embodiments, preventing may include using a streams management engine to monitor a task manager for the stream computing environment, and canceling (e.g., blocking) any checkpoint operations initiated by the first windowed stream operator with respect to the second portion of the first subset of the set of stream computing data. In this way, checkpointing may be performed with respect to the set of stream computing data without a redundant checkpoint. Other methods of preventing checkpointing using the first windowed stream operator are also possible.

At block 988, the set of stream computing data may be checkpointed using the second windowed stream operator to checkpoint a second portion of the first subset of the set of stream computing data. The checkpointing may be performed with respect to the stream computing environment. Generally, checkpointing can include recording, saving, logging, preserving, storing, maintaining, or otherwise retaining the set of stream computing data using the second windowed stream operator to checkpoint a second portion of the first subset of the set of stream computing data. The second portion may include a part, segment, section, or fraction of the first subset of the set of stream computing data. In embodiments, the second portion may include a segment of the stream computing data that is exclusively used by (e.g., unique to, particular to) the second windowed stream operator (e.g., not shared by other windowed stream operators). In embodiments, the second portion may differ from (e.g., not overlap with, be mutually exclusive with respect to) the first portion of the first subset of the set of stream computing data. As an example, in a situation in which the set of stream computing data relates to an Internet-of-Things environment, the second portion may include a subset of the set of stream computing data that includes air pressure measurements that are marked for sorting by a second windowed stream operator of a sorting operator. In embodiments, checkpointing the second portion of the set of stream computing data using the second windowed stream operator may include configuring the second windowed stream operator to parse the set of stream computing data stored in one or more windows to identify the second portion of the first subset of the set of stream computing data (e.g., tuples marked for processing by the second windowed stream operator), and subsequently writing the second portion to set of designated memory addresses for storage. Other methods of checkpointing the set of stream computing data using the second windowed stream operator to checkpoint a second portion of the first subset of the set of stream computing data are also possible.

In embodiments, the second windowed stream operator may be prevented from checkpointing the first portion of the first subset of the set of stream computing data at block 989. The preventing may be performed with respect to the stream computing environment. Generally, preventing can include limiting, blocking, restricting, forbidding, controlling, or otherwise regulating checkpointing of the second portion of the first subset of the set of stream computing data by the second windowed stream operator. In embodiments, preventing may include locking the first subset of the set of stream computing data with respect to the second windowed stream operator. For instance, in certain embodiments, locking may include establishing a read-operation lock, a write-operation lock, or both with respect to the second subset of the set of stream computing data to prohibit read or write access to the first subset of the set of stream computing data by the second windowed stream operator. In certain embodiments, preventing may include locking one or more memory spaces to disallow the second windowed stream operator from carrying-out a checkpointing operation of the first subset of the set of stream computing data. Other methods of preventing checkpointing of the first subset of the set of stream computing data by the second windowed stream operator are also possible.

Method 900 concludes at block 999. Aspects of method 900 may provide performance or efficiency benefits related to checkpointing a set of stream computing data. Altogether, leveraging non-redundant checkpointing with respect to shared data of a set of windowed stream operators may be associated with benefits such as data storage efficiency, bandwidth, and stream computing application performance. Aspects may save resources such as bandwidth, disk, processing, or memory.

Figure 10:
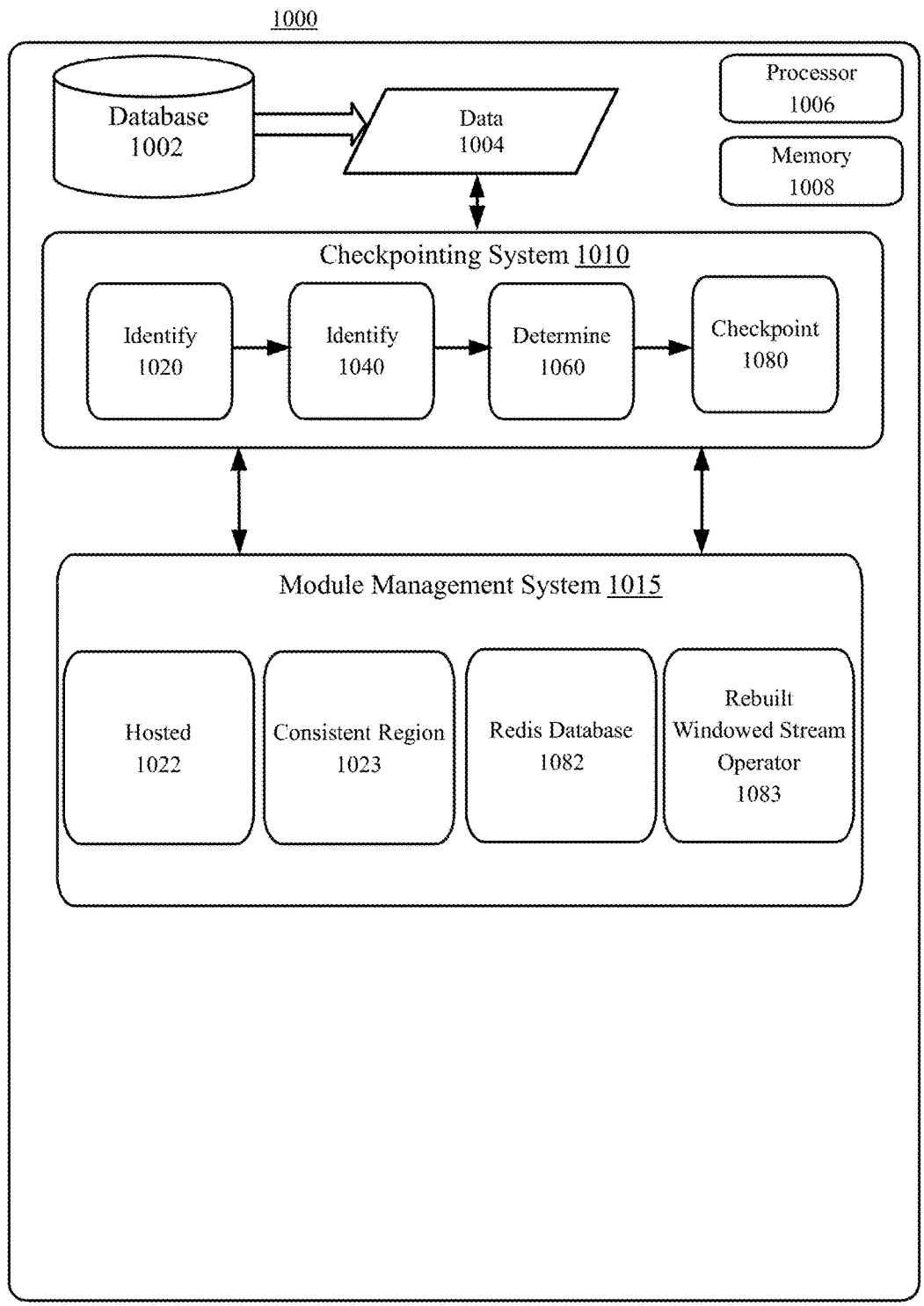
FIG. 10 illustrates an example system for checkpointing a set of stream computing data with respect to a stream computing environment having a set of windowed stream operators including both a first windowed stream operator and a second windowed stream operator, according to embodiments.

FIG. 10 shows an example system 1000 for checkpointing a set of stream computing data with respect to a stream computing environment having a set of windowed stream operators including both a first windowed stream operator and a second windowed stream operator, according to embodiments. The example system 1000 may include a processor 1006 and a memory 1008 to facilitate implementation of checkpointing a set of stream computing data. The example system 1000 may include a database 1002 (e.g., checkpointing database). In embodiments, the example system 1000 may include a checkpointing system 1010. The checkpointing system 1010 may be communicatively connected to the database 1002, and be configured to receive data 1004 related to checkpointing. The checkpointing system 1010 may include an identifying module 1020 to identify that the first windowed stream operator has a first subset, an identifying module 1040 to identify that the second windowed stream operator has the first subset, a determining module 1060 to determine to checkpoint the first subset, and a checkpointing module 1080 to checkpoint the set of stream computing data. The checkpointing system 1010 may be communicatively connected with a module management system 1015 that includes one or more modules for implementing aspects of checkpointing a set of stream computing data.

In embodiments, it may be detected that the first windowed stream operator is hosted by a first compute node at module 1022. The detecting may be performed with respect to the stream computing environment. It may be detected that the second windowed stream operator is hosted by a second compute node. The detecting may be performed with respect to the stream computing environment. Aspects of the disclosure relate to the recognition that, in some situations, one or more of the set of windowed stream operators may be located on separate computing nodes. Accordingly, aspects of the disclosure relate to checkpointing a set of stream computing data for windowed stream operators on separate compute nodes. Generally, detecting can include sensing, discovering, collecting, recognizing, distinguishing, generating, obtaining, ascertaining, or otherwise determining that the first windowed stream operator is hosted by a first compute node and the second windowed stream operator is hosted by a second compute node. The first and second compute nodes may include physical or virtual computing environments configured to maintain, support, and facilitate performance of one or more stream operators of a stream computing application. In embodiments, the first and second compute nodes may include separate physical servers. In certain embodiments, the first and second compute nodes may include virtual machines or virtualized containers located on distributed hosts. As described herein, aspects of the disclosure relate to detecting that the first windowed stream operator is hosted by a first compute node and detecting that the second windowed stream operator is hosted by a second compute node. In embodiments, detecting may include analyzing a network topology map for the stream computing environment and identifying that the first windowed stream operator is maintained on the first compute node and that the second windowed stream operator is maintained on a second compute node. As described herein, aspects of the disclosure relate to determining a checkpointing procedure based on the placement arrangement of the set of windowed stream operators (e.g., placement on different compute nodes may affect the performance characteristics, bandwidth requirements, or other factors). Other methods of detecting that the first windowed stream operator is hosted by the first compute node and detecting that the second windowed stream operator is hosted by the second compute node are also possible.

In embodiments, it may be detected that the first windowed stream operator is in a first consistent region at module 1023. The detecting may be performed with respect to the stream computing environment. It may be detected that the second windowed stream operator is in a second consistent region. The detecting may be performed with respect to the stream computing environment. Generally, detecting can include sensing, discovering, collecting, recognizing, distinguishing, generating, obtaining, ascertaining, or otherwise determining that the first windowed stream operator is in a first consistent region and that the second windowed stream operator is in a second consistent region. The first and second consistent regions may include subgraphs (e.g., areas, portions, regions) of a stream computing environment configured to reduce data loss as a result of software errors events and hardware failure. The first and consistent regions may be configured to process each tuple within the subgraph at least once (e.g., at least-once processing guarantee), such that tuples that exit the consistent region may be associated with new operating behavior (e.g., as established by one or more operators of the consistent region). The first consistent region may differ from the second consistent region. For instance, in embodiments, the first consistent region or the second consistent region may differ with respect to at least one stream operator (e.g., the first consistent region has a stream operator not included in the second consistent region). In certain embodiments, the first consistent region and the second consistent region may be mutually exclusive (e.g., no overlap). In embodiments, detecting may include using the streams management engine to parse an operating graph for the stream computing environment and ascertain that the first windowed stream operator is deployed in the first consistent region and the second windowed stream operator is deployed in the second consistent region. Other methods of detecting that the first windowed stream operator is in the first consistent region and the second windowed stream operator is in the second consistent region are also possible.

In embodiments, the set of stream computing data may be checkpointed in a Redis database at module 1082. Generally, checkpointing can include recording, saving, logging, preserving, storing, maintaining, or otherwise retaining the set of stream computing data in a Redis database. The Redis database may include a key-value database for storing, retrieving, and managing data in a set of associative arrays (e.g., hashes). The set of associative arrays may include a collection of data objects (e.g., records) that have one or more fields for data storage. Data objects may be stored and retrieved using keys that uniquely identify particular data objects within the array. In embodiments, checkpointing may include receiving a submission of a set of stream computing data from one or more windowed stream operators, and assigning one or more keys to subsets of the set of stream computing data (e.g., based on data type). The assigned keys may be used to organize and store the set of stream computing data in one or more associative arrays of the Redis database. In embodiments, the Redis database may be configured to hold the stored set of stream computing data in main memory. In certain embodiments, the Redis database may be configured to hold the stored set of stream computing data in virtual memory such that a portion of the set of stream computing data is saved to a non-volatile storage device (e.g., hard disk). In certain embodiments, the Redis database may be configured to capture a snapshot of the set of stream computing data (e.g., periodically transferring data between memory and disk in an asynchronous fashion) to promote persistent availability of the set of stream computing data (e.g., to allow for retrieval, rebuilding stream operators). Other methods of checkpointing the set of stream computing data in the Redis database are also possible.

In embodiments, a first rebuilt windowed stream operator may be assembled at module 1083. The assembling may be performed based on and in response to checkpointing the set of stream computing data without the redundant checkpoint of the first subset of the set of stream computing data related to the first and second windowed stream operators. A second rebuilt windowed stream operator may be assembled. The assembling may be performed based on and in response to checkpointing the set of stream computing data without the redundant checkpoint of the second subset of the set of stream computing data related to the first and second windowed stream operators. Aspects of the disclosure relate to the recognition that, in some situations, it may be desirable to retrieve a portion of the set of stream computing data that has been checkpointed. Accordingly, aspects of the disclosure relate to assembling rebuilt windows for the first and second windowed stream operators using the checkpointed set of stream computing data. Generally, assembling can include building, creating, constructing, putting-together, forming, establishing, or otherwise structuring the first rebuilt windowed stream operator and the second rebuilt windowed stream operator. The first and second rebuilt windowed stream operators may include stream operators that substantially correspond to the state of the first and second windowed stream operators, respectively, before checkpointing of the set of stream computing data. In embodiments, the first and second rebuilt windowed stream operators may be associated with the same stream operator windows, window sizes, operator functionality, access privileges, and stream computing data as before performance of the checkpointing operation. In embodiments, assembling may include fetching the first and second subsets of the set of stream computing data from a designated memory resource (e.g., where it was checkpointed), and generating the first and second rebuilt windowed stream operators based on the first and second subsets of the set of stream computing data, respectively. As an example, consider a first windowed stream operator including a filter operator that is associated with a window size of 2 gigabytes and a first subset of the set of stream computing data, and a second windowed stream operator including a join operator that is associated with a window size of 1.4 gigabytes and a second subset of the set of stream computing data. As described herein, assembling may include retrieving the first and second subsets of the set of stream computing data from the designated memory resource where they were checkpointed, and creating a first rebuilt windowed stream operator that has a window size of 2 gigabytes and is associated with the first subset of the set of stream computing data and a second rebuilt windowed stream operator that has a window size of 1.4 gigabytes and is associated with the second subset of the set of stream computing data. In certain embodiments, assembling the first and second rebuilt windowed stream operators may be performed in response to detecting a trigger event with respect to the stream computing environment (e.g., error or malfunction, network topology change, hostpool configuration change, operator fusion event). As such, the stream computing environment may roll-back to (e.g., return to, revert to) a previous state based on the checkpointed set of stream computing data. Other methods of assembling the first and second rebuilt windowed stream operators based on and in response to checkpointing the set of stream computing data are also possible.

Consider the following example. A stream computing environment may be analyzed using a streams management engine, and it may be identified that a stream computing application includes a first group of several hundred stream operators hosted on a first compute node, and a second group of several hundred stream operators on a second compute node. In embodiments, the second group of stream operators may be located in a consistent region (e.g., such that the entire consistent region must be stored when checkpointing is performed), while the first group of stream operators correspond to a FileSource (e.g., where small sets of stream computing data are checkpointed). As described herein, the streams management engine may identify that the first group of stream operators and the second group of operators share a first subset of stream computing data related to a social media environment. Based on the first and second groups of stream operators having the same first subset of stream computing data, it may be determined to checkpoint the first subset of the set of stream computing data. In embodiments, as described herein, independent checkpoint procedures may be generated for the first and second groups of stream operators based on the host characteristics for each group. For instance, in embodiments, a first checkpoint procedure for the first group of stream operators may be ascertained in which a designated subset of the first group of stream operators carries-out checkpoint operations for the first group (e.g., as the amount of data to be checkpointed is small, checkpoint operations may be handled by a few stream operators without impacting system performance). As another example, a second checkpoint procedure for the second group of stream operators may be ascertained in which each stream operator of the second group of stream operators individually performs checkpoint operations for a non-overlapping subset of the set subset of stream computing data (e.g., as the entire consistent region must be checkpointed, handling checkpoint operations on an operator-level basis may be associated with efficient load balancing). As such, the first and second checkpoint procedures may be performed to store the first subset of the set of stream computing data to a Redis server. In the event of a triggering event (e.g., error or malfunction, network topology change, hostpool configuration change, operator fusion event), the first subset of the set of stream computing data may be retrieved from the Redis server to assemble one or more rebuilt windowed stream operators. Other methods of managing checkpointing with respect to a stream computing environment are also possible.

Figure 11:
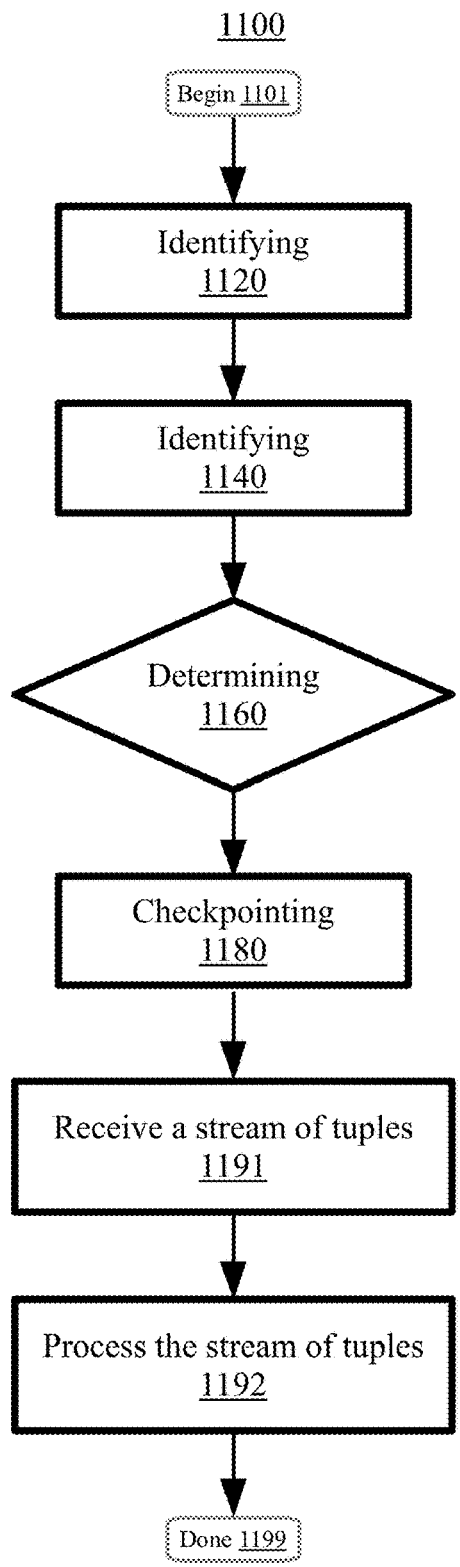
FIG. 11 is a flowchart illustrating a method for checkpointing a set of stream computing data with respect to a stream computing environment having a set of windowed stream operators including both a first windowed stream operator and a second windowed stream operator, according to embodiments.

FIG. 11 is a flowchart illustrating a method 1100 for checkpointing a set of stream computing data with respect to a stream computing environment having a set of windowed stream operators including both a first windowed stream operator and a second windowed stream operator, according to embodiments. Aspects of method 1100 may be similar or the same as method 600/700/800/900/1000, and aspects may be utilized interchangeably. The method 1100 may begin at block 1101. At block 1120, it may be identified that the first windowed stream operator has a first subset of the set of stream computing data. The identifying may be performed with respect to the stream computing environment. At block 1140, it may be identified that the second windowed stream operator has the first subset of the set of stream computing data. The identifying may be performed with respect to the stream computing environment. At block 1160, it may be determined to checkpoint the first subset of the set of stream computing data without a redundant checkpoint related to the first and second windowed stream operators. The determining may be performed based on both the first and second windowed stream operators having the first subset of the set of stream computing data. At block 1180, the set of stream computing data may be checkpointed. The checkpointing may be performed without the redundant checkpoint of the first subset of the set of stream computing data related to the first and second windowed stream operators. The checkpointing may be performed with respect to the stream computing environment.

At block 1191, the stream of tuples may be received to be processed by a set of processing elements (e.g., stream operators) which operates on a set of compute nodes (e.g., in a stream application environment). The stream of tuples may be received consistent with the description herein including FIGS. 1-14. Current/future processing by the plurality of processing elements may be performed consistent with the description herein including FIGS. 1-14. The set of compute nodes may include a shared pool of configurable computing resources. For example, the set of compute nodes can include a public cloud environment, a private cloud environment, a distributed batch data processing environment, or a hybrid cloud environment. In certain embodiments, each of the set of compute nodes are physically separate from one another.

At block 1192, the stream of tuples may be processed using the set of processing elements operating on the set of compute nodes. The stream of tuples may be processed by the plurality of processing elements operating on the set of compute nodes. The stream of tuples may be processed consistent with the description herein including FIGS. 1-14. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 1100 concludes at block 1199. Aspects of method 1100 may provide performance or efficiency benefits related to checkpointing a set of stream computing data. Altogether, leveraging non-redundant checkpointing with respect to shared data of a set of windowed stream operators may be associated with benefits such as data storage efficiency, bandwidth, and stream computing application performance. Aspects may save resources such as bandwidth, disk, processing, or memory.

Figure 12:
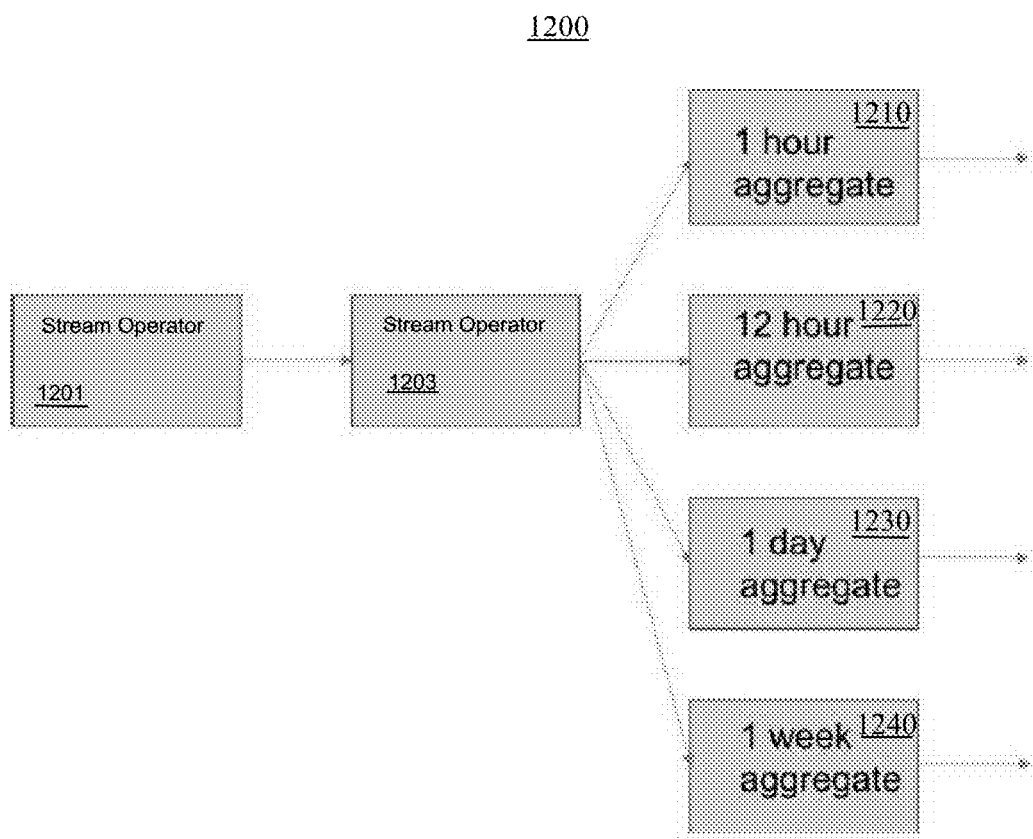
FIG. 12 illustrates an example for checkpointing a set of stream computing data with respect to a stream computing environment having a set of windowed stream operators including both a first windowed stream operator and a second windowed stream operator, according to embodiments.

FIG. 12 illustrates an example 1200 for checkpointing a set of stream computing data with respect to a stream computing environment having a set of windowed stream operators including both a first windowed stream operator 1201 and a second windowed stream operator 1203, according to embodiments. Aspects of the example 1200 relate to the recognition that, in some situations, checkpoints (e.g., aggregates) may be periodically created for stream operators to save the state of an operator graph. For instance, as shown in FIG. 12, a first checkpoint 1210 may be created after an hour, a second checkpoint 1220 may be created after 12 hours, a third checkpoint 1230 may be created after 1 day, and a fourth checkpoint 1240 may be created after 1 week. As described herein, in some situations, the stream computing data saved by one checkpoint may be redundant with respect to the stream computing data saved by another checkpoint. As an example, the third checkpoint 1230 may include sets of stream computing data for both the first checkpoint 1210, the second checkpoint 1220, as well as new data collected since the time of the second checkpoint 1220, such that the data for the third checkpoint 1230 may overlap with data saved by previous checkpoints. Accordingly, as described herein, aspects of the disclosure relate to checkpointing a set of stream computing data in a non-redundant fashion (e.g., to promote stream computing environment efficiency).

Figure 13:
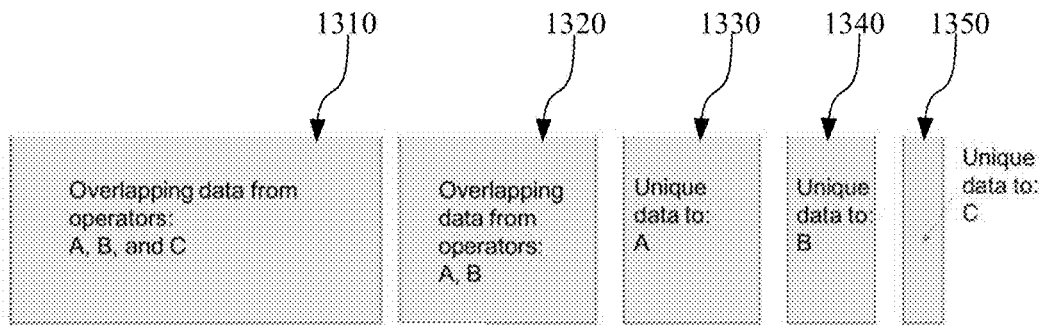
FIG. 13 illustrates an example for checkpointing a set of stream computing data with respect to a stream computing environment having a set of windowed stream operators including both a first windowed stream operator and a second windowed stream operator, according to embodiments.

FIG. 13 illustrates an example 1300 for checkpointing a set of stream computing data with respect to a stream computing environment having a set of windowed stream operators including both a first windowed stream operator and a second windowed stream operator, according to embodiments. Aspects of the example 1300 relate to the recognition that, in some embodiments, the set of stream computing data may include overlapping data from a plurality of stream computing operators. For instance, consider a stream computing environment including three windowed stream computing operators A, B, and C. As shown in FIG. 13, a first set of stream computing data 1310 may include overlapping data for all three windowed stream computing operators A, B, and C. The first set of stream computing data 1310 may include a first stream computing data subset 1320 that includes overlapping data from operators A and B, a second stream computing data subset 1330 that includes data unique to operator A, a third stream computing data subset 1340 that includes data unique to operator B, and a fourth stream computing data subset 1350 that includes data unique to operator C. As described herein, aspects of the disclosure relate to performing checkpoint operations for the three windowed stream computing operators A, B, and C without redundant checkpointing. For instance, in embodiments, a particular stream operator (e.g., operator A) may be designated to checkpoint the set of stream computing data 1310 for all three of the windowed stream computing operators to eliminate the need for redundant checkpointing by other stream operators (e.g., operator B or C). As another example, checkpoint operations may be divided between each of the three windowed stream computing operators to facilitate workload and bandwidth balancing in the stream computing environment. For instance, stream operator A may be configured to manage checkpointing of the second stream computing data subset 1330, stream operator B may be configured to manage checkpointing of the third stream computing data subset 1340, and stream operator C may be configured to manage checkpointing of the fourth stream computing data subset 1350 (e.g., each windowed stream operator performs checkpointing for its own data to eliminate redundancy). Other methods of checkpointing stream computing data in a non-redundant fashion are also possible.

Figure 14:
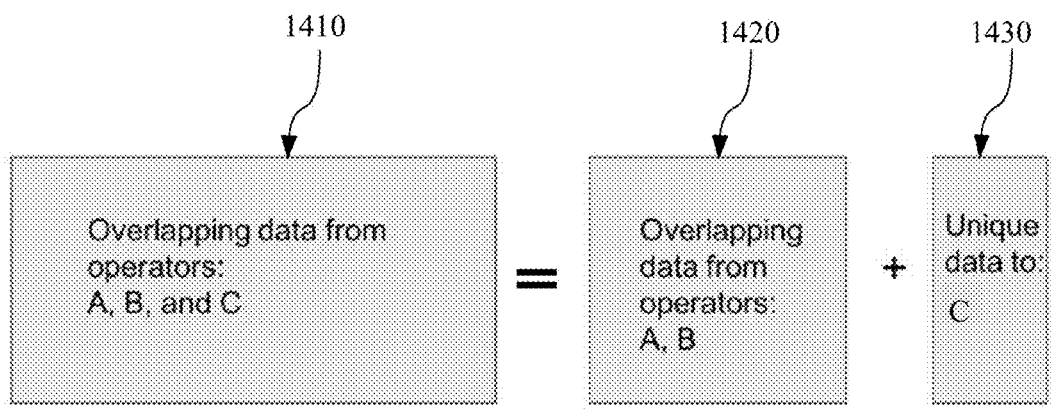
FIG. 14 illustrates an example for checkpointing a set of stream computing data with respect to a stream computing environment having a set of windowed stream operators including both a first windowed stream operator and a second windowed stream operator, according to embodiments.

FIG. 14 illustrates an example 1400 for checkpointing a set of stream computing data with respect to a stream computing environment having a set of windowed stream operators including both a first windowed stream operator and a second windowed stream operator, according to embodiments. Aspects of the example 1400 relate to assembling a rebuilt windowed stream operator based on a checkpointed set of stream computing data. Consider once again a stream computing environment including three windowed stream computing operators A, B, and C. In certain embodiments, one or more rebuilt windowed stream operators may be assembled used checkpointed data. For instance, in certain embodiments, a streams management engine of the stream computing environment may be configured to retrieve a first subset 1420 of the set of stream computing data corresponding to stream computing data for operators A and B and a second subset 1430 of the set of stream computing data corresponding to stream computing data for operator C from a designated memory resource. Accordingly, the first subset 1420 may be combined with the second subset 1430 to assemble a set of stream computing data 1410 for a rebuilt windowed stream operator. In this way, the checkpointed set of stream computing data may be used to roll-back to (e.g., return to, revert to) a previous state based on the checkpointed set of stream computing data. Other methods of assembling rebuilt windowed stream operators based on checkpointed data are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for checkpointing a set of stream computing data with respect to a stream computing environment having a set of windowed stream operators including both a first windowed stream operator and a second windowed stream operator, the method comprising:

identifying, with respect to the stream computing environment, that the first windowed stream operator has a first subset of the set of stream computing data;

identifying, with respect to the stream computing environment, that the second windowed stream operator has the first subset of the set of stream computing data;

determining, based on both the first and second windowed stream operators having the first subset of the set of stream computing data, to checkpoint the first subset of the set of stream computing data without a redundant checkpoint related to the first and second windowed stream operators; and checkpointing, with respect to the stream computing environment, the set of stream computing data without the redundant checkpoint of the first subset of the set of stream computing data related to the first and second windowed stream operators.

2. The method of claim 1, further comprising:

checkpointing, with respect to the stream computing environment, the set of stream computing data using the first windowed stream operator to checkpoint the first subset of the set of stream computing data; and preventing, with respect to the stream computing environment, the second windowed stream operator from checkpointing the first subset of the set of stream computing data.

3. The method of claim 2, further comprising:

detecting a first throughput factor for the first windowed stream operator;

detecting a second throughput factor for the second windowed stream operator;

comparing the first and second throughput factors for the first and second windowed stream operators;

computing that the first throughput factor exceeds the second throughput factor; and determining, based on the first throughput factor exceeding the second throughput factor, to use the first windowed stream operator to checkpoint the first subset of the set of stream computing data.

4. The method of claim 1, further comprising:

determining, in response to compiling a stream computing application with respect to the stream computing environment, to checkpoint the first subset of the set of stream computing data without the redundant checkpoint related to the first and second windowed stream operators.

5. The method of claim 1, further comprising:

determining, in advance of compiling a stream computing application with respect to the stream computing environment, to checkpoint the first subset of the set of stream computing data without the redundant checkpoint related to the first and second windowed stream operators.

6. The method of claim 5, further comprising:

compiling the stream computing application to use a shared memory, related to the first and second windowed stream operators, for the first subset of the set of stream computing data.

7. The method of claim 1, further comprising:

identifying, with respect to the stream computing environment, that the first windowed stream operator has a second subset of the set of stream computing data;

identifying, with respect to the stream computing environment, that the second windowed stream operator has a third subset of the set of stream computing data;

checkpointing, with respect to the stream computing environment, the set of stream computing data using the first windowed stream operator to checkpoint the second subset of the set of stream computing data; and checkpointing, with respect to the stream computing environment, the set of stream computing data using the second windowed stream operator to checkpoint the third subset of the set of stream computing data.

8. The method of claim 7, further comprising:

identifying, with respect to the stream computing environment, that the first windowed stream operator does not have the third subset of the set of stream computing data; and identifying, with respect to the stream computing environment, that the second windowed stream operator does not have the second subset of the set of stream computing data.

9. The method of claim 1, further comprising:

checkpointing, with respect to the stream computing environment, the set of stream computing data using the first windowed stream operator to checkpoint a first portion of the first subset of the set of stream computing data; and checkpointing, with respect to the stream computing environment, the set of stream computing data using the second windowed stream operator to checkpoint a second portion of the first subset of the set of stream computing data.

10. The method of claim 9, further comprising:

preventing, with respect to the stream computing environment, the first windowed stream operator from checkpointing the second portion of the first subset of the set of stream computing data; and preventing, with respect to the stream computing environment, the second windowed stream operator from checkpointing the first portion of the first subset of the set of stream computing data.

11. The method of claim 1, further comprising:

detecting, with respect to the stream computing environment, that the first windowed stream operator is hosted by a first compute node; and detecting, with respect to the stream computing environment, that the second windowed stream operator is hosted by a second compute node.

12. The method of claim 1, further comprising:

detecting, with respect to the stream computing environment, that the first windowed stream operator is in a first consistent region; and detecting, with respect to the stream computing environment, that the second windowed stream operator is in a second consistent region.

13. The method of claim 1, further comprising:

checkpointing the set of stream computing data in a Redis database.

14. The method of claim 1, further comprising:

assembling, based on and in response to checkpointing the set of stream computing data without the redundant checkpoint of the first subset of the set of stream computing data related to the first and second windowed stream operators, a first rebuilt windowed stream operator; and assembling, based on and in response to checkpointing the set of stream computing data without the redundant checkpoint of the second subset of the set of stream computing data related to the first and second windowed stream operators, a second rebuilt windowed stream operator.

15. The method of claim 1, further comprising:

performing, in a dynamic fashion to streamline checkpointing of the set of stream computing data, each of: the identifying, the identifying, the determining, and the checkpointing.

16. The method of claim 1, further comprising:

executing, in an automated fashion without user intervention, each of:
the identifying, the identifying, the determining, and the checkpointing.

17. The method of claim 1, further comprising:

receiving a stream of tuples to be processed by a set of processing elements operating on a set of compute nodes; and processing, using the set of processing elements operating on the set of compute nodes, the stream of tuples.

18. The method of claim 1, further comprising:

detecting, with respect to the stream computing environment, that the first windowed stream operator is hosted by a first compute node;

detecting, with respect to the stream computing environment, that the second windowed stream operator is hosted by a second compute node;

detecting, with respect to the stream computing environment, that the first windowed stream operator is in a first consistent region;

detecting, with respect to the stream computing environment, that the second windowed stream operator is in a second consistent region;

identifying, with respect to the stream computing environment, that the first windowed stream operator has a second subset of the set of stream computing data;

identifying, with respect to the stream computing environment, that the second windowed stream operator has a third subset of the set of stream computing data;

identifying, with respect to the stream computing environment, that the first windowed stream operator does not have the third subset of the set of stream computing data;

identifying, with respect to the stream computing environment, that the second windowed stream operator does not have the second subset of the set of stream computing data;

checkpointing, with respect to the stream computing environment, the set of stream computing data using the first windowed stream operator to checkpoint the second subset of the set of stream computing data;

checkpointing, with respect to the stream computing environment, the set of stream computing data using the second windowed stream operator to checkpoint the third subset of the set of stream computing data;

detecting a first throughput factor for the first windowed stream operator;

detecting a second throughput factor for the second windowed stream operator;

comparing the first and second throughput factors for the first and second windowed stream operators;

computing that the first throughput factor exceeds the second throughput factor;

determining, based on the first throughput factor exceeding the second throughput factor, to use the first windowed stream operator to checkpoint the first subset of the set of stream computing data;

determining, in response to compiling a stream computing application with respect to the stream computing environment, to checkpoint the first subset of the set of stream computing data without the redundant checkpoint related to the first and second windowed stream operators;

checkpointing, with respect to the stream computing environment, the set of stream computing data using the first windowed stream operator to checkpoint the first subset of the set of stream computing data;

preventing, with respect to the stream computing environment, the second windowed stream operator from checkpointing the first subset of the set of stream computing data; and checkpointing the set of stream computing data in a Redis database.

19. A system for checkpointing a set of stream computing data with respect to a stream computing environment having a set of windowed stream operators including both a first windowed stream operator and a second windowed stream operator, the system comprising:

a memory having a set of computer readable computer instructions, and a processor for executing the set of computer readable instructions, the set of computer readable instructions including:

identifying, with respect to the stream computing environment, that the first windowed stream operator has a first subset of the set of stream computing data;

identifying, with respect to the stream computing environment, that the second windowed stream operator has the first subset of the set of stream computing data;

determining, based on both the first and second windowed stream operators having the first subset of the set of stream computing data, to checkpoint the first subset of the set of stream computing data without a redundant checkpoint related to the first and second windowed stream operators; and checkpointing, with respect to the stream computing environment, the set of stream computing data without the redundant checkpoint of the first subset of the set of stream computing data related to the first and second windowed stream operators.

20. A computer program product for checkpointing a set of stream computing data with respect to a stream computing environment having a set of windowed stream operators including both a first windowed stream operator and a second windowed stream operator, the computer program product comprising a computer readable storage medium having program instructions embodied therewith, wherein the computer readable storage medium is not a transitory signal per se, the program instructions executable by a processor to cause the processor to perform a method comprising:

identifying, with respect to the stream computing environment, that the first windowed stream operator has a first subset of the set of stream computing data;

identifying, with respect to the stream computing environment, that the second windowed stream operator has the first subset of the set of stream computing data;

determining, based on both the first and second windowed stream operators having the first subset of the set of stream computing data, to checkpoint the first subset of the set of stream computing data without a redundant checkpoint related to the first and second windowed stream operators; and checkpointing, with respect to the stream computing environment, the set of stream computing data without the redundant checkpoint of the first subset of the set of stream computing data related to the first and second windowed stream operators.

* * * * *